(12) United States Patent
Lee

(10) Patent No.: US 7,233,722 B2
(45) Date of Patent: Jun. 19, 2007

(54) SYSTEM AND METHOD FOR FIBER OPTICS BASED DIRECT VIEW GIANT SCREEN FLAT PANEL DISPLAY

(75) Inventor: Yee Chun Lee, Mountain View, CA (US)

(73) Assignee: General Display, Ltd., Mountain View, CA (US)

( * ) Notice: Subject to any disclaimer, the term of this patent is extended or adjusted under 35 U.S.C. 154(b) by 0 days.

(21) Appl. No.: 11/203,865

(22) Filed: Aug. 15, 2005

(65) Prior Publication Data

US 2007/0036492 A1 Feb. 15, 2007

(51) Int. Cl.
*G02B 6/26* (2006.01)
*G02B 6/36* (2006.01)

(52) U.S. Cl. .............................. 385/31; 385/17; 385/89
(58) Field of Classification Search ..................... None
See application file for complete search history.

(56) References Cited

U.S. PATENT DOCUMENTS

| | | | | |
|---|---|---|---|---|
| 6,028,977 A * | 2/2000 | Newsome | | 385/147 |
| 6,278,425 B1 * | 8/2001 | DeLuca | | 345/84 |
| 6,750,605 B2 * | 6/2004 | Moore | | 313/495 |
| 6,757,459 B2 * | 6/2004 | Troll | | 385/18 |
| 6,917,751 B2 * | 7/2005 | Wang et al. | | 385/147 |
| 2003/0219196 A1 * | 11/2003 | Weng et al. | | 385/17 |

* cited by examiner

Primary Examiner—Tina M. Wong
(74) Attorney, Agent, or Firm—Greenberg Traurig, LLP

(57) ABSTRACT

An apparatus and method for displaying large format images, graphics, and videos. The apparatus comprise a layer of column oriented optical fibers, each fiber is illuminated at one end by at least one laser diode, and a second layer which sits in front of the first layer and is parallel to the first layer, whose projected area substantially overlap that of the first layer. The second layer comprises a plurality of optical fibers arranged in rows. In between the first and second layer sits a third layer of optical switching elements. Alternatively, the second layer can be a light diffusing layer. Laser lights emitted from the laser diodes travel in parallel along respective column fiber until they are redirected by optical switching elements which couple the laser lights within the column fibers to the row fibers or to the difflusing layer directly whereby they are scattered by the diffusing elements to reach the viewing audience. The small size of the fibers results in very small fill factor, allowing light absorbing matrix and backing layer to absorb ambient light effectively. The contrast ratio under ambient light condition is further enhanced by the use of multilayer dielectric optical filter to preferentially absorb ambient light.

20 Claims, 37 Drawing Sheets

SYSTEM AND METHOD FOR FIBER OPTICS BASED DIRECT VIEW GIANT SCREEN FLAT PANEL DISPLAY

DESCRIPTION OF THE RELATED ART

Displays are the pivotal components of modern information technology systems, ranging from large wall-mounted TVs and projection TV systems, through desktop flat-panel monitors and the ubiquitous notebook and laptop computers, to mobile phones, PDAs and wearable computing systems.

The cathode ray tube (CRT) was the prevailing display technology roughly ten years ago; it was used in large and small screen TVs, projection TVs, desktop computer monitors, etc. Today the majority of the computer monitors, both for desktops or laptops, digital TVs, cell phones, PDAs, are dominated by technologies other than that of CRT. Only low end analogue TVs, and professional studio quality TV monitors, still employ CRT technology because of its low cost and superior picture quality for displaying images.

Currently, LCD (liquid crystal display) is the predominant technology for displays. It is widely deployed in computer monitors, laptop computers, projection TVs, ED (enhanced definition) and HD (high definition) digital TVs, cell phones, and PDAs. LCD displays have a slim design and a flat viewing surface, and its high dynamic contrast ratio, flicker free images, and precise pixel (picture element) registration make it inherently a superior display for computers. However, LCD displays fall short in several areas when compared with the older CRT technology. First of all, LCD technology cannot match the accuracy of color reproduction of the CRT technology, because of its smaller color gamut, defined as the area inside the triangle formed by connecting its three primary colors. Second, the LCD tends to have much smaller viewing angles, and thirdly, the LCD's dynamic range falls far short of that of the CRT technology. However, the LCD technology is still progressing at a rapid pace. Recent advances in flat panel LCD technology now allow for larger screens, wider viewing angles, and higher-quality video images.

LCD display works the following way; two sheets of glass substrates coated with transparent electrodes and polymer alignment films on the inner sides, are used to sandwich the liquid crystal material inside. The liquid crystal molecules will line themselves up at the alignment layer boundaries. The directions of alignment between the upper glass plate and the lower one are orthogonal, thus forcing the liquid crystals into a twisted structural arrangement. The twist could be a simple 90° twist or a 270° twist (the latter is called "super-twisted"). Light that travels through the twisted liquid crystal structure is also twisted as it passes by following the twists of the molecules. When voltage is applied across the liquid crystal sandwich, the polar molecules of the liquid crystal realign themselves along the direction of the electric field. A light that passes through the realigned liquid crystal sandwich is no longer twisted. Hence if a pair of mutually orthogonal polarizing filters are added on each side of the liquid crystal sandwich, the light that passes through the first polarizer will passes through the second polarizer if no external electric field is applied across the sandwich, but it will not be able to pass through the second polarizer if a strong enough electric field is applied. For weaker electric field, the liquid crystal molecules will only be partially realigned with the direction of the electric field, hence the light that passes through it will be twisted to a greater or less degree depending on the strength of the electric field, thus the strength of the electric field determines the intensity of the light that passes through the sandwich, creating a gray scale. Additional color filters are needed for each pixel, or picture element, if full color display is desired. The crystals themselves do not produce light, so the technology is non-emissive and therefore does not give off radiation like an older TV does. Fluorescent tubes housed behind the transparent material are used to illuminate the image, so they require less power to operate than CRT televisions and plasma displays.

For a large display, it is clearly impractical to address the individual pixel separately because of the number of pixels involved. Currently, the addressing is done with two sets of electrodes called X-electrodes and Y-electrodes, both made of transparent conducting material, usually indium tin oxide (ITO). The X-electrodes are laid on the lower glass of the liquid crystal sandwich, say, and the Y-electrodes on the upper glass panel. Switching transistors or diodes are attached to each pixel to switch the pixel on or off. Pixel addressing using X-Y matrix and individual switching transistors for each pixel is called active matrix addressing scheme. In the X-Y matrix addressing scheme the Y-electrodes are used to select the row of pixels for addressing, and the X-electrodes are fed with voltages corresponding to the gray scale value of each pixel. The switching transistors are typically thin film transistors, hence such addressing is often called TFT, or thin film transistors addressing.

LCD displays have excellent image stability and sharpness. They are relatively light weight and thin, and consume little power in comparison with CRT screens that they displaced. LCD screens are also bright, exceeding CRT in brightness. Even though LCD displays tend to have lower static contrast ratio than that of CRTs, the dynamic contrast is actually higher. However, LCD displays can't compete with CRTs when it comes to chromatic range, and response time. Recent advances such as the conversion from passive matrix display drive technique to active display drive technique have made LCD screens more responsive, and acceptable speeds have been reached to allow video and TV viewing.

Plasma display technology works much the same way a household fluorescent light works. It uses a network of red, green and blue phosphors mounted between two layers of glass separated by an approximately 100 micron spacing within a vacuum envelope. A small alternating current electric pulse of several hundred volts for each pixel is used to ionize the rare gas of argon, neon, or xenon to produce the plasma, which emits ultraviolet light. Plasma is a gas that made up of free electrons and mostly positive ions as well as neutrals. It is inherently unstable since the ions and electrons have a tendency to recombine into neutrals. Color phosphors, acting as scintillation agents, convert the plasma discharge light into red, green and blue lights. Plasma screens have excellent memory effect; once the plasma is created by the electric pulse, it will decay back into the original neutral gases with a finite decay time. The decay time can be adjusted to enable screens to be refreshed quickly.

The addressing of the individual pixel is done pretty much the same way it is done for LCD screens. However, since plasma screens have inherent memory characteristics, active matrix addressing, or putting switching transistor(s) behind each pixel, is not needed. This makes plasma displays cheaper to produce than LCD displays for the same screen size, as long as the cost of adding transistors to each pixel is high. The down side is that each plasma pixel can only be turned on or off, so to provide gray scales, PCM (pulse coded modulation) is used to control the brightness of each pixel. However, since plasma displays require a large glass enclosure that can withstand atmospheric pressure, they tend to be a lot heavier and more costly to make, hence once the cost of the drive electronics gets lower as chip technology improves, the overall cost of plasma displays will eventually become higher than that of LCD displays.

Proper choice of color scintillation agents or phosphors allows a broad chromatic range for plasma displays. In this regard, plasma screens can have a broader chromatic space than that of either CRT or LCD. The contrast is very high for plasma screens since, unlike LCD, which is basically a light valve array, plasma display creates its own light and when it is off, it is completely off. Plasma displays also have very wide viewing angles, especially compared to LCD displays. The main reason is that since plasma screens generate light, no light-robbing polarizers are needed. However, since it would be difficult to manufacture tiny plasma pixels that are less than 0.5 mm in size, plasma display technology is only for big screens. Also, since pulse coded modulation is used for brightness control, some image flickering is unavoidable. Plasma displays also suffer from "burn-in", a phenomenon shared by CRT technology. This is not surprising because both technologies use phosphors to generate light. For the same reason, plasma screens tend to have a shorter life. Finally, compared to LCD screens, plasma displays consumes roughly twice the power of comparable sizes. This can be attributed to the low emission efficiency of the plasma displays, despite having high optical efficiency.

In spite of the popularity of plasma displays for large screen applications and their current superiority in terms of image quality, it is generally believed that they will be replaced by their LCD counterparts. LCD technologies have advanced at a rapid pace, and LCD panel size as large as 84" diagonal is already in the laboratory. Manufacturers prefer LCD because of the similarity to semiconductor fabrication techniques, whereas plasma screens require large vacuum glass enclosures which still have to be manufactured in the traditional way and does not benefit from Moorse' law.

One of the latest hot entrants to the display arena is the organic light emitting diode displays, or OLED. A pixel of an OLED display sandwiches organic films between two electrodes, a metallic cathode and a transparent anode. The organic films consist of a hole-injection layer, a hole transport layer, an emissive layer, and an electron transport layer. When it is subjected to a potential difference between the two electrodes, the injected hole and electron recombine in the emissive layer to create electroluminescent light. Since OLED emits light itself, no cumbersome backlight, as in LCD, is needed. OLED can also be vertically stacked for full color displays. It can be manufactured using organic vapor phase deposition technology, and high resolution patterning can be done using ink-jet printing and cold welding to drastically lower production costs. The addressing of the individual OLED pixel is the same as in active matrix LCD. The lack of backlighting device means that the display can be paper thin and can be bended. However, currently OLED technology still surfers from long term stability and durability problems. This is because OLED can not tolerate even the tiniest amount of moisture and/or oxygen and has to be perfectly sealed. Also, the OLED compounds degrade over times, limiting the maximum life of a display. OLED is also not an efficient light emitter. However, since blue, red, and green OLED are available, each pixel of an OLED display can be made of a blue, red, and green OLED, hence no power robbing color filters are needed. Also, since the OLED needs not be turned on whenever a pixel is dark, the average power requirement is usually a lot less than that needed to light up all the OLED diodes on the screen, hence average power consumption of an OLED display is often lower than that of a comparable LCD screen.

OLED displays use simpler organic compounds for the films. One can also use more complex organic polymers for the films. When polymer films are used, the displays are called PLED. OLED can also be addressed either in an active matrix or passive matrix fashion. Active matrix OLED displays can switch very fast, making them suitable for full motion video. Passive matrix OLED displays require a grid-like stacking and the individual pixels are turned either on or off, making them suitable for text and icon displays in audio and dashboard equipments where low cost manufacturing is the main concern.

OLED can be brighter, and have broader viewing angles and higher contrast than LCD technology. With an active matrix display driver, it also switches much faster than LCD displays. This, in combination with the fact that the power consumption is proportional to the average pixel gray level value, makes it a better display technology than that of LCD. Moreover, with no backlight, the active matrix OLED display can be extremely thin, less than 2 mm in thickness. So it is possible to have OLED displays that are bendable. Equally important, OLED can be manufactured using inkjet printing technology, potentially making them easier and cheaper to manufacture than their LCD counterparts. The only major drawback is the longevity of the display materials. Currently, because of the manufacturing difficulties, OLED displays are still confined mostly to screen sizes smaller than 10 inches, although larger displays have been demonstrated.

Another less well known display technology is Iridigm, Each pixel of the Iridigm display has a MEMS (microelectromechanical system) light switch composed of two conductive plates. One is a thin conducting film stack on a glass substrate, the other is a thin metallic membrane suspended over it. The suspended element has two stable states, when no voltage is applied, the plates are separated by an air gap and the ambient light is reflected or absorbed depending on the wavelength, giving rise to color. By varying the air gap, the color can be changed. When a small voltage is applied, the two plates are pulled together by the electrostatic force and the light is absorbed, turning the pixel dark. A 3 color pixel would consist of 3 separate elements with air gaps corresponding to the three primitive colors red, green and blue.

The pixel memory is made possible by the hysteresis effect inherent in the MEMS membrane. Once the metallic membrane has been pulled down, it requires less energy to hold it. Because of this, Iridigm displays can be addressed passively, thus greatly reducing the complexities as well as the costs of the addressing hardware. The down side of this is that each color pixel can only display 8 distinct colors, owing to the on-off nature of the addressing process. To render gray scales, multiple pixels of varying sizes are needed. Another way is to use pulse width modulation to obtain a limited range of gray scale. Both will increase the cost of the driver hardware dramatically.

Iridigm display does not rely on backlight for illumination, instead, because of its high optical efficiency, it can use reflected ambient light for illumination. This makes it extremely power efficient. It is also extremely thin, even thinner than OLED in overall thickness. In fact, all essential functionality, including light modulation, addressing, and color selection, is contained within one micron of thin films, making it the thinnest display technology.

Iridigm displays are light weight, low power consuming, and sharp. Their brightness depends on the level of ambient lighting. Since the color is produced by interference, there is a viewing angle dependence of the perceived color. Nevertheless, the usable viewing angles are still larger than those of the LCD technology. The main drawbacks are the lack of backlighting, the durability (MEMS technology generally suffers from stiction problem, a problem associated with the tendency of the MEMS parts to stick together or slide poorly. The problem gets worse with age), and the scalability to very large scale displays.

All the aforementioned display technologies suffer from the problems of high initial setup cost as well as high recurrent production costs. Moreover, none of the technologies mentioned scale up very well to very large screen sizes. Both LCD and plasma display technology require very large glass panels with numerous spacers to maintain uniform thickness throughout the entire panel in order to scale up to very large display sizes. In the case of plasma displays, such large glass panels also need to withstand the enormous atmospheric pressure, which escalates the cost of manufacturing such panels. For LCD displays, the cost of active matrix addressing elements goes up dramatically with the screen size. Although screen sizes of 102" for PDP (plasma display panel) and 82" for LCD have been demonstrated, their production costs will likely dissuade most people from buying them.

Both OLED and Iridigm technologies are promising because of their thinness and wide viewing angles. However, both still have to overcome their shortcomings in the area of durability and scalability. For small molecule OLED displays, the individual diodes are built up by chemical vacuum deposition technique, which requires very large vacuum chanbers to make a giant screen display. For polymer OLED displays, it is possible to use inkjet printing, screen printing, or any of the contact technologies used for ordinary inks. Potentially, with large format inkjet printers, it would be possible to print extremely large polymer OLED displays. However, the printing has to be done in the absence of moisture and oxygen, and the low conductivity of inkjet printed circuit board means that additional process is needed to enhance the conductivity when the display is scaled to such large sizes. Even if all these can be overcome, the need to scale up the active matrix control electronics remains a problem which OLED shares with active matrix LCD displays.

Building a large Iridigm display would be extremely difficult since it would require a large scale MEMS manufacturing. Current MEMS production technology can only produce small MEMS devices. Even if such a display screen could be made, the pulse width modulation used in the passive matrix addressing is still a major problem since as the screen size increases; the MEMS light switches also become proportionally larger. Since the response time of the MEMS switch is directly proportional to the size of the MEMS elements, for very large screen sizes the MEMS switches would fail to keep up with the fast pulse width modulation necessary to provide the gray scale resolution needed for high quality display images.

All the aforementioned display technologies require the implementation of some forms of advanced addressing methods in order to provide image and video qualities that meet the need of the consumers. Such implementations are inherently costly and do not scale up well to large displays. Most also require large glass panels where the distances between the two adjacent panels must be kept constant using strategically placed spacers with very small tolerance for deviation. The cost of manufacturing and assembling such panels for large displays proves prohibitive. None of the display technologies discussed above is particularly power efficient except the one by Iridigm, which currently can't be scaled up to large screen sizes. As screen sizes increase, thermal management becomes a big issue which may necessitate the inclusion of active cooling at some stage.

Therefore, is a need to provide a large screen direct-view display device that does not require expensive and complicated schemes to address the individual pixels.

There exits a need a to provide a large screen direct-view display device that does not require large glass substrates or backlight and can be sheathed in thin, flexible plastics.

There exits a need a to provide a flexible direct-view giant screen display device that can be bent and rolled for easy transport and stowage.

There exits a need a to provide a giant screen direct-view display device that is easy and low cost to manufacture.

And there exits a need a to provide a large screen display device that consumes low power and can dissipate heat naturally without the need of complicated thermal management schemes.

SUMMARY

In one embodiment, there is provided a device and method for displaying images and high speed videos in a large format. The device includes a row array of color laser diodes in a repeated pattern of red, green and blue, or R, G, B, order. The laser diodes can emit red, green, and blue lights directly. Alternatively, the laser diodes can also produce lights in the blue part of the spectrum or near ultra-violet, and rely on phosphorescence to produce colored lights. Each laser diode is optically coupled to a column glass fiber. The column glass fiber preferably can support a single mode. However, multimode fibers can be used for jumble displays where maximum brightness is required.

The display device in accordance with one embodiment includes an X-Y addressing mechanism in which video signals for all columns are simultaneously fed to the respective laser diodes in a row-sequential manner. Corresponding to each row there is provided an optical switching means which can redirect the laser lights for all columns to a light diffuser which scatters the laser lights into viewer's eyes. By sequentially redirecting the laser lights for each row on, and then off, in quick succession, a video image is formed. Flicker reduction may be accomplished by coating the diffuser with phosphors having an appropriate phosphorescence lifetime.

One embodiment also provides a method and apparatus for reducing ambient light reflection and inter-pixel crosstalk which have detrimental effects on display contrast ratio under ambient light conditions. To this end a black backing layer and a black matrix are used to absorb ambient light and prevent crosstalk, and multilayer dielectric narrowband optical filters is used to differentially absorb undesired stray lights and allow selected lights to pass through. The effectiveness of such measures is greatly enhanced by the very small fill factor of the display elements in the proposed giant screen display, and by the narrowband nature of the laser diode emission.

In one embodiment, the row optical switching means is formed of a horizontally oriented hollow tube with a multitude of minute vertical connectors which connect the tube just below with a liquid filled reservoir tube. The reservoir tube has a much larger volume than that of the upper tube. The hollow tube is made of a substrate (glass in one embodiment) that is pressed against all the column fibers at their respective intersections. Each tube has an electrode that runs the length of the tube, with opposite polarity. The liquid is transparent and is a good insulator and the surface of both tubes as well as the interconnecting tubes is such that it's affinity with the liquid is as small as possible, i.e. the tube wall is non-wetting. The fluid is charged by the electrode embedded in the reservoir tube. The top electrode is normally floating; hence the liquid tends to stay within the reservoir. When a voltage is applied to the top electrode, it attracts the liquid with sufficient force to allow the liquid to overcome its own surface tension and fills the upper tube. The index of refraction of the liquid is such that it is only slightly lower than that of the column optical fibers, so that when the upper tube is filled, the laser lights are optically coupled to the liquid filled tube. The coupling efficiency can be close to 100% with appropriate contact geometries. For single mode column fibers, the optical coupling length in the direction of the column fiber can be quite short. For multimode fibers, the optical coupling length is characteristically longer. However, multimode fibers can carry much more light energy than that of a single mode fiber, hence is more suited for very large displays where optical coupling length is not a big issue.

While using insulating fluid is provided in one embodiment, alternatives can be used. For example, the fluid may be an ionizing fluid, and the tube wall is made of material that becomes negatively charged when in contact with such a fluid. The ultra-thin fluid-wall boundary layer of a few nanometers is populated predominantly by positive ions. When the top electrode for a given row is connected to a negative terminal, the negative electrode (cathode) attracts the boundary layer cations (positive ions) to move toward the cathode, carrying the bulk of the fluid with it. This phenomenon is called electroosmosis, and the Electroosmotic force between the electrode and the fluid replaces the electrostatic force of in one embodiment. Although Electroosmotic force is typically weaker than the electrostatic force of other embodiments, the fact that the fluid is overall neutral rather than being charged may be useful in environment where electrostatic discharge, or ESD, could be a problem. However, it should be noted that CRT uses electron beam for illumination and addressing, the negative charge resides in the tube is a more serious ESD issue, but clever engineering has minimized that problem to a point where ESD is not a major issue for CRT.

In an alternative embodiment, the coupling tubes are vertical and in optical and mechanical contact with the column fibers. A piezoelectric micro-pump similar to one used in the inkjet head is employed for each row to inject transparent liquid droplet down the coupling tubes. The speeds of the droplets are maintained by an air pump which keeps a constant pressure difference between the front and back of the individual droplet. A near perfect optical coupling occurs at the instantaneous location of the droplet, redirecting the laser light of the diffuser. To reduce manufacturing cost, the piezoelectric micro-pumps for a plurality of rows can be integrated together into a single unit. The transparent walls of the coupling tube should have index of refraction slightly smaller than that of the main column fibers. The inner wall surface should be non-wetting for the liquid, and the surface tension of the liquid should be sufficiently strong to ensure that the liquid droplet can maintain its shape even when it is subjected to a pressure difference which propels it at a constant velocity.

In another alternative embodiment, an actuator is used to move a row diffraction grating to one of the bistable positions. In one position, the diffraction grating is within 0.1 micron of the column fibers, and in the other position, the grating is well out of the 0.1 micron range. The diffraction grating is chosen so that, given the wavelength of the lights emitted from laser diodes, the grating can cause the light to be diffracted when it is within 0.1 micron of the fiber. In yet another embodiment, the diffraction grating is replaced by a thin slab of transparent material with an index of refraction closely matching that of the column fibers. In both embodiments, the laser lights are redirected to a diffuser screen through the action of the row actuators. The actuator means is preferably a piezoelectric ceramic bimorph that is capable of a displacement of a fraction of a micron. Alternatively, the actuator could be an electret based bimorph, or a piezoelectric copolymer such as PVC based bimorph.

In still another alternative embodiment, a slow surface acoustic wave (SAW) propagating in a transparent substrate with index of refraction close to that of the fiber and a low modulus of elasticity is used for optical switching needed for X-Y addressing. A SAW pulse train propagating down the column fiber with a wavelength calculated to maximally scatter the laser light within the column fiber is used to perform the row scanning. The SAW substrate is coated directly on the front face of each column fiber, and a piezoelectric transducer on the top end of the column is used to launch the SAW signal. As the SAW wave trains are traveling down the column fibers, lights from the respective laser diodes are scattered to the diffuser screen. An alternative to SAW is bulk acoustic wave, or BAW. BAW penetrate deeper into the substrate, allowing thinner substrate to be used which may improve optical coupling. Still another alternative is to employ a flexural acoustic wave. Attenuation and dispersion compensation are provided by repeater/amplifier using inter-digitated electrode sensors and actuators.

Another embodiment provides a method for enhancing the dynamic contrast ratio of the video displays. Laser diodes inherently have an exceedingly high static contrast ratio which is defined as the ratio of the highest rumination to the lowest lamination that a pixel can display. Dynamic contrast ratio is defined as the contrast ratio of a pixel in the presence of surrounding pixels of various gray scale values. Dynamic contrast ratio is most strongly affected by adjacent/neighboring pixel crosstalk. The absence of faceplate of the present inventive display technology inherently minimizes inter-pixel crosstalk. Crosstalk is further minimized by erecting a black matrix barrier to ensure that laser lights from proximal and distal pixels are blocked and/or absorbed before they reach the diffuser screen. The black matrix structure extends also to the diffuser screen itself in order to absorb ambient light. The effectiveness of the black matrix structure is enhanced by the very small filling factor of the laser diode display.

Still another aspect of one embodiment provides a method for building a thin and flexible large screen display. The column fiber has eccentric core that is bare on the viewing side, uncovered by the cladding, buffer and the jacket. This allows its backside to be bounded to a strength material, preferably plastics reinforced by glass fiber or Kevlar. The front side (the viewing side) switching fibers are similarly bounded to the jacket of the column fibers. The diffluser screen can be bounded directly to the switching fibers to form a multi-layer thin film giant screen display.

BRIEF DESCRPTION OF THE DRAWINGS

Various other objects, features and attendant advantages of the present invention will become fully appreciated as the same becomes better understood when considered in conjunction with the accompanying drawing, in which like reference characters designate the same or similar parts throughout the several views, and wherein.

DETAILED DESCRIPTION

Figure 1:
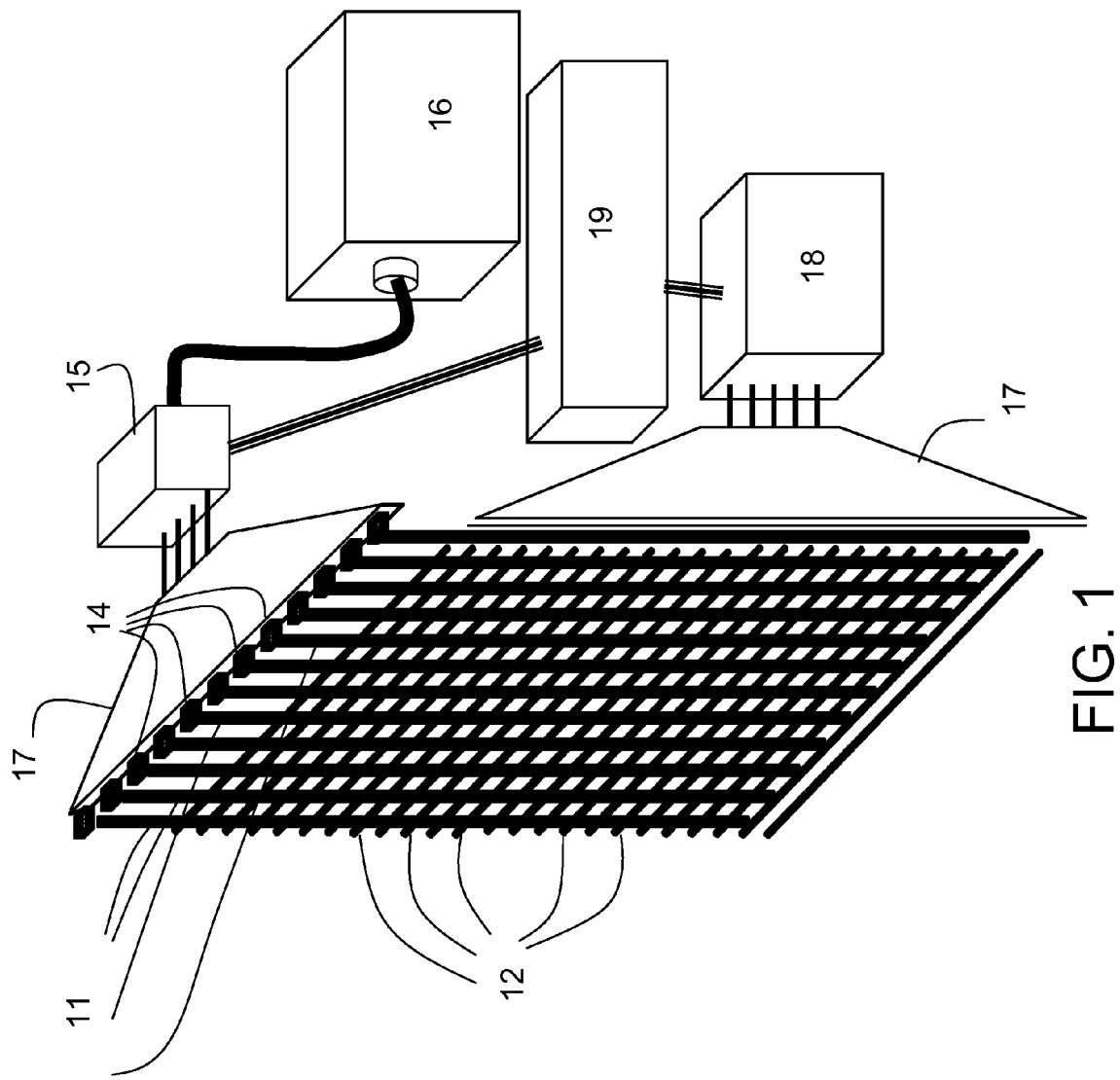
FIG. 1 is a view of a laser diode fiber optics display system constructed in accordance with the present invention.

In the following detailed description of the present invention, numerous specific details are set forth in order to provide a thorough understanding of the present invention. However, it will become obvious to those skilled in the art that the present invention may be practiced without these specific details. In other instances, well-known methods, procedures, materials, components and circuitry have not been described in detail to avoid unnecessary obscuring aspects of the present invention. The detailed description is presented largely in terms of simplified two dimensional views. These descriptions and representations are the means used by those experienced or skilled in the art to concisely and most effectively convey the substance of their work to others skilled in the art.

Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of process flow representing one or more embodiments of the invention do not inherently indicate any particular order nor imply any limitations of the invention.

The present invention utilizes one important fact in the physics of optical fiber, namely, when another substrate of similar index of refraction is either in contact or is close enough to be able to intercept the evanescent wave field of a coherent light wave that is propagating along the fiber optics waveguide, then the energy of the coherent optical fiber guided light wave can be coupled to the other substrate partially, or entirely, depending on the length of the contact along the direction of the optical waveguide. If the contact length is long enough and if the light energy that is coupled to the substrate immediately escapes, then the coupling can approach 100%. An evanescent wave in this case means an electromagnetic wave such as a light wave that decays exponentially with distance. Typically, when there is a total reflection, an evanescent wave is formed at the boundary. This is the case with optical fiber where the evanescent wave has been used for gas sensing.

Alternatively, an optical grating can be introduced which directly intercepts the evanescent wave of the optical fiber guided light; the presence of the optical grating can scatter the evanescent wave. Here again, for long enough optical grating along the length of the optical fiber, total coupling (or scattering) of the guided light wave is possible.

The evanescent decay length of the light depends on both the wavelength of the light as well as the refraction index of the optical fiber. For example, if a fluorocarbon plastic fiber with an index of refraction of 1.42 is used, then for red light the evanescent length is 0.12 micron, for green light 0.10 micron, and for blue light 0.085 micron. These are very small distances to travel, making it possible to modulate the light coupling using actuator which has very limited travel.

Thus the light propagating within the optical fiber can be switched at any given point along the fiber just by moving a substrate of similar refraction index in and out of the evanescent wave field of the optical fiber. Alternatively, the substrate can also be replaced by an optical grating of appropriate grating spacing, or by a material whose index of refraction can be changed.

Turning now to the drawings, there is shown in FIG. 1 an embodiment of the laser fiber optics display system. The display screen comprises a multitude of single-mode optical fibers 11 which form the columns of the screen and a multitude of optical fibers 12 which form the rows of the display. The row fibers are fed from one end by individual laser diodes 14 which in turns are controlled by the column driver 15. The column driver converts the serial video input from a video source 16 to parallel row signals and simultaneously feed them to the laser diodes through a fan out 17 one row at a time. The column driver also performs necessary gray scale to laser diode current mapping to ensure that laser diode light output is linearly proportional to the corresponding gray scale value for that row. The laser light traveling along each column fiber is coupled to a row fiber selected by row selection means 18. At any given time, only one row is selected and the row is the same for all columns. In order to conform to the most typical format of the video source, the rows are selected in sequential row order. However, for some computer generated video source, other row selection order may be preferable. In such cases a software reconfiguration of the column driver can be done on the fly if the column driver hardware is real-time reconfigurable. The row selection means is synchronized with the serial-to-parallel operation of the column driver via the synchronization unit 19.

Figure 2:
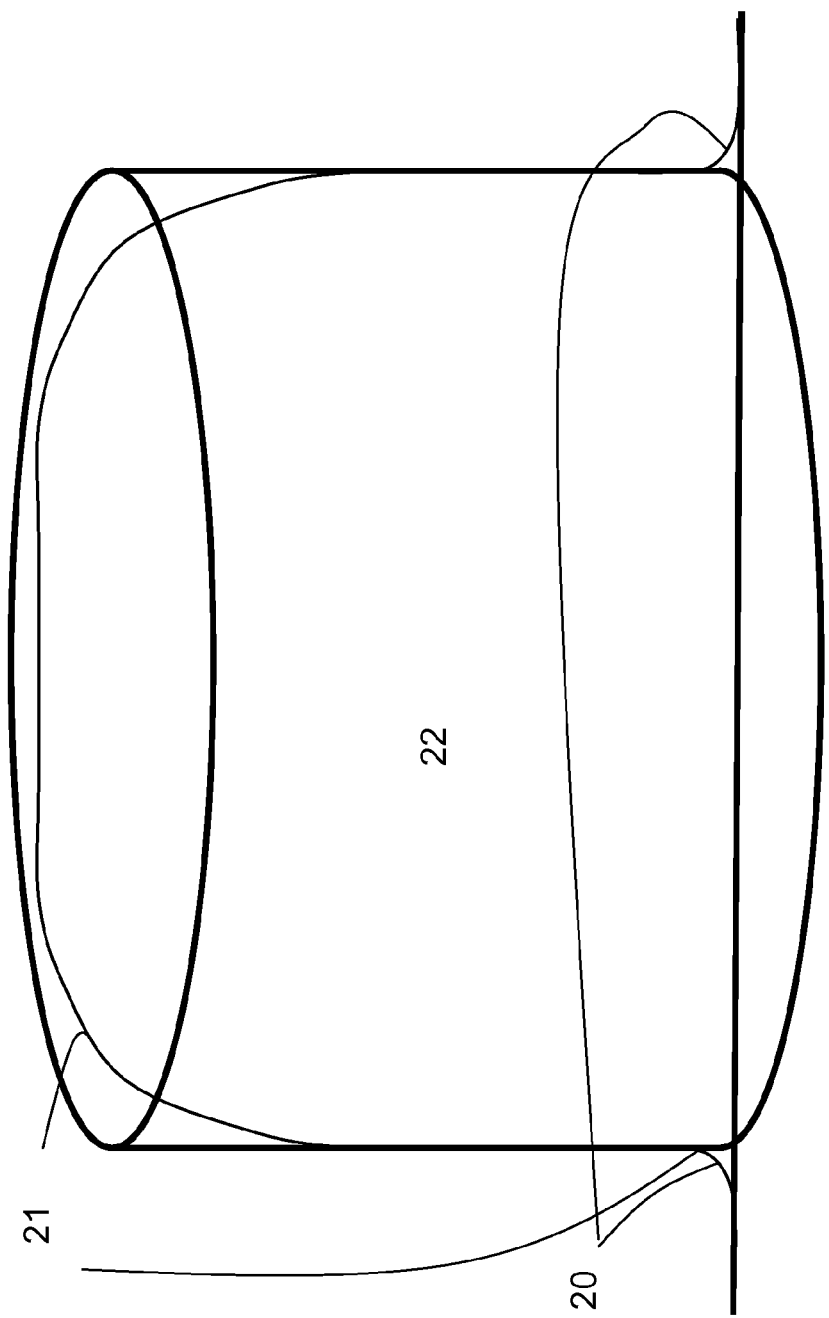
FIG. 2 is a cross sectional view of the evanescent laser wave field just outside a column fiber.

The evanescent wave 20 of the laser light is localized at the air fiber boundary of a column fiber, as shown in FIG. 2 for red laser light. Also shown is the laser light intensity 21 which peaks at the central axis of the column fiber 22 and decreases monotonically away from it and decays rapidly just outside the fiber. The figure is meant only to be informative and does not accurately reflect the variation of the light intensity as a function of the distance from center.

Figure 3:
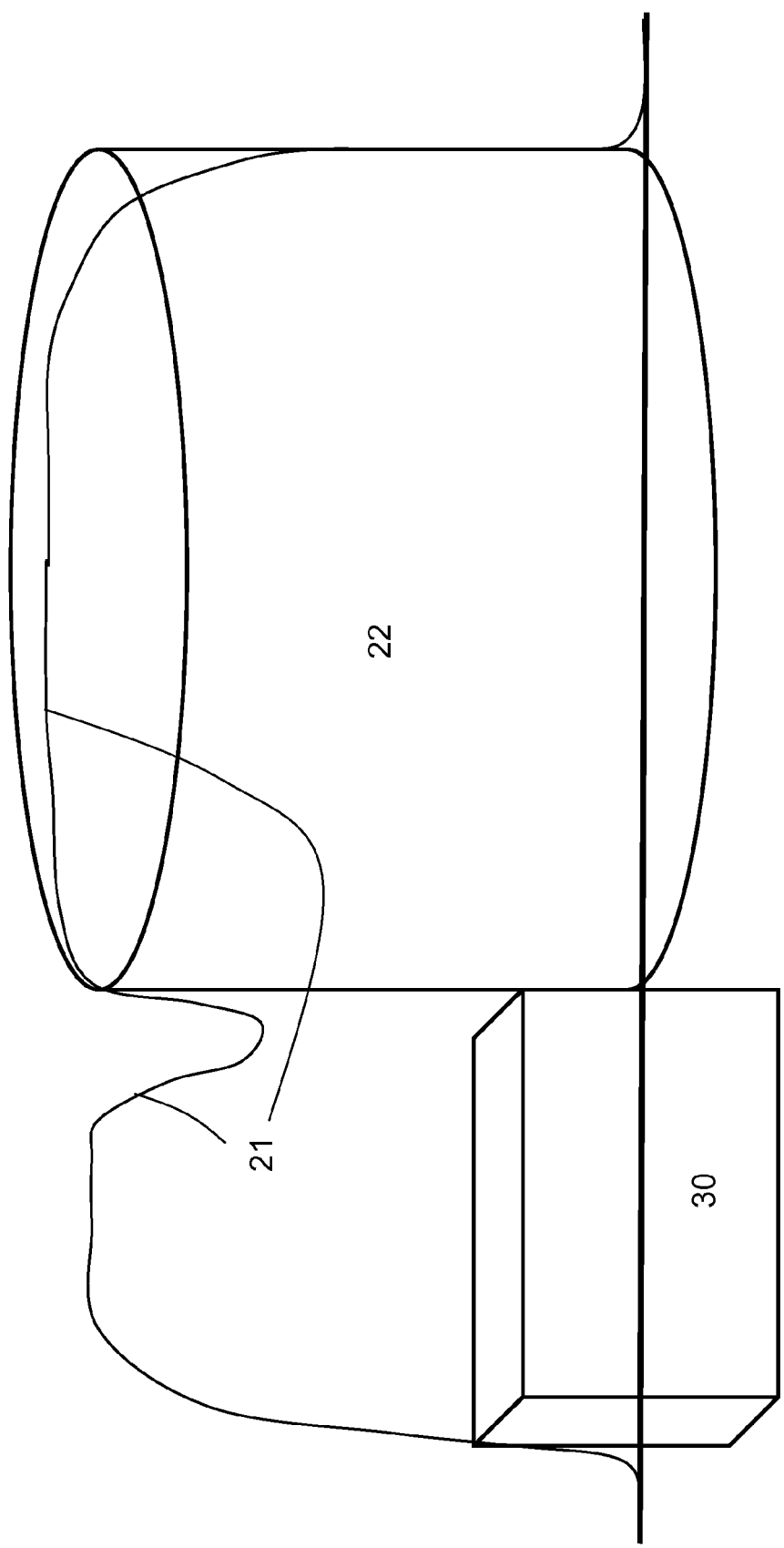
FIG. 3 shows the light intensity when a substrate of the same or similar refraction index is brought within the evanescent wave field of the coherent laser light traveling alone a column fiber.

FIG. 3 shows the light intensity when a substrate 30 of the same or similar refraction index is brought close to a column fiber. The second substrate will couple with the coherent light strongly if the substrate is sufficiently close to the column fiber that it intercepts the evanescent field of the column fiber. The narrow air gap between the substrate and the column fiber allows the light from the column fiber to tunnel through it to reach the substrate. The larger the air gap, the harder it is for the light to tunnel through, and the stronger the dip in light intensity at the gap. Where the substrate is in direct contact with the column fiber, the dip disappears completely.

Figure 4:
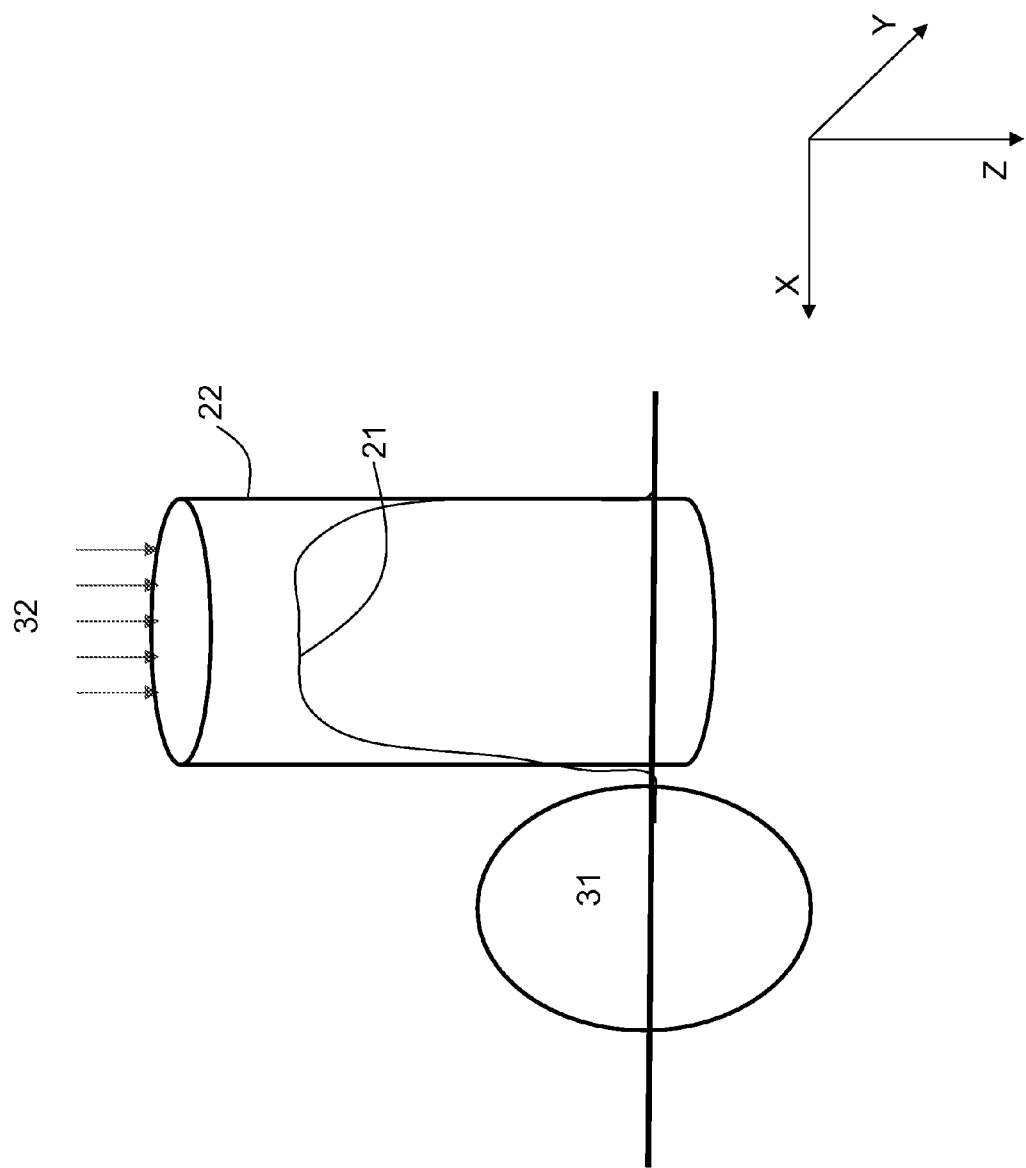
FIG. 4 depicts the intensity distribution of the laser light when the substrate is separated from the column fiber by more than a few times the evanescent decay length of the optical fiber.

FIG. 4 depicts the situation when the substrate, or row fiber 31, is separated from the column fiber by more than a few times the evanescent decay length of the optical fiber. In this case the substrate-column fiber coupling becomes exponentially small and the tunneling of the laser light 32 from the column fiber to the substrate becomes negligible.

Figure 5:
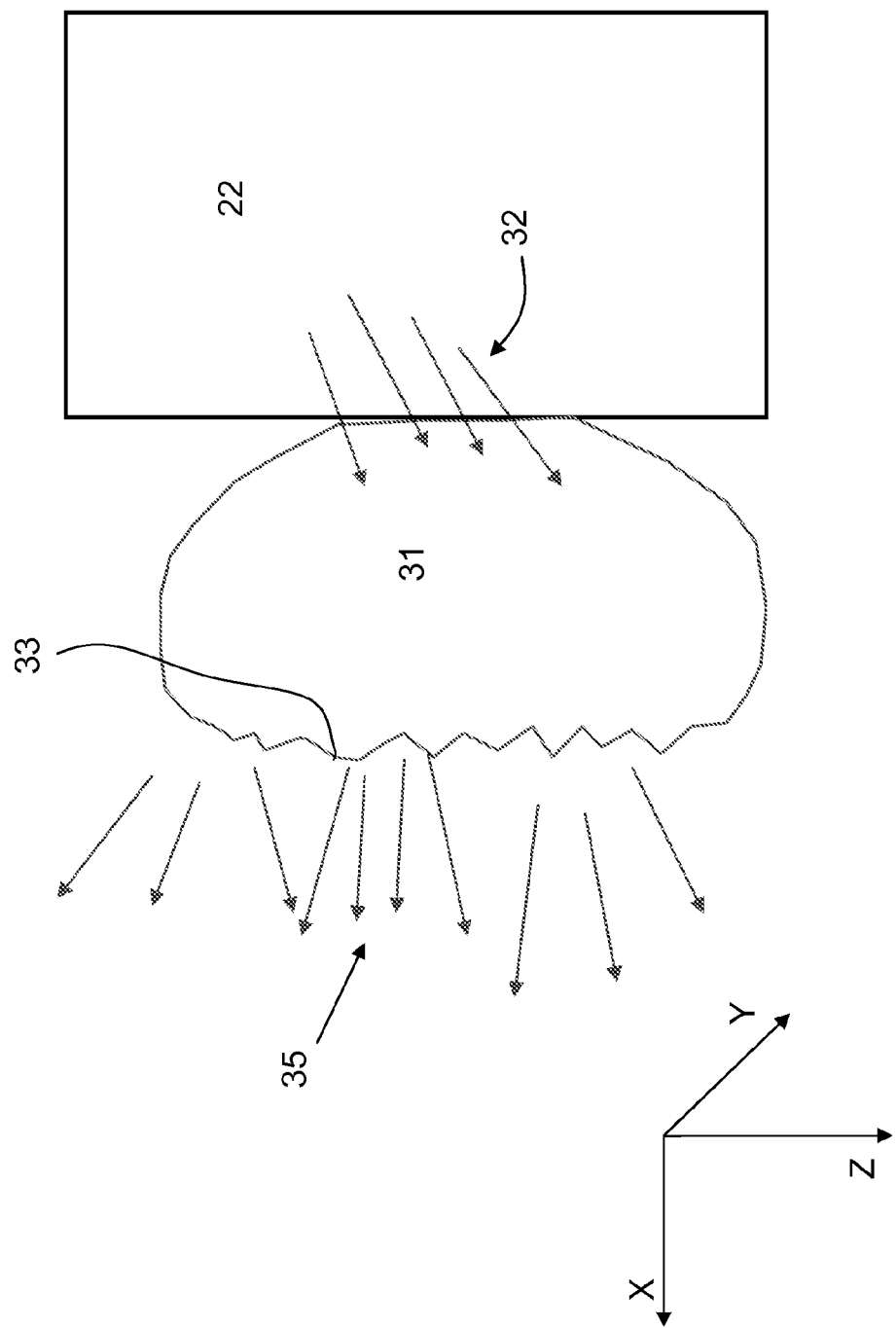
FIG. 5 is a view illustrating the use of random grating on a row fiber to scatter laser light toward the audience.

FIG. 5 shows the random grating 33 on the side of the row fiber which faces away from the column fiber. The role of the random grating 33 is to facilitate the escape of the laser light 32 by scattering. The scattering is most effective when the modulation wavelength of the random grating 33 is of the same order as the wavelength of the light wave. The grating is used to scatter light out of the row fiber substrate 31 toward the viewers of the screen. In order to ensure a wide viewing angle of the scattered light 35 in both the vertical and horizontal directions, the grating grooves should have arbitrary orientation instead of only the orientation along the row fiber as is depicted. The random undulation wavelength as well as the depth of undulation determines the viewing angle in the direction perpendicular to the orientation of the grooves.

Figure 6:
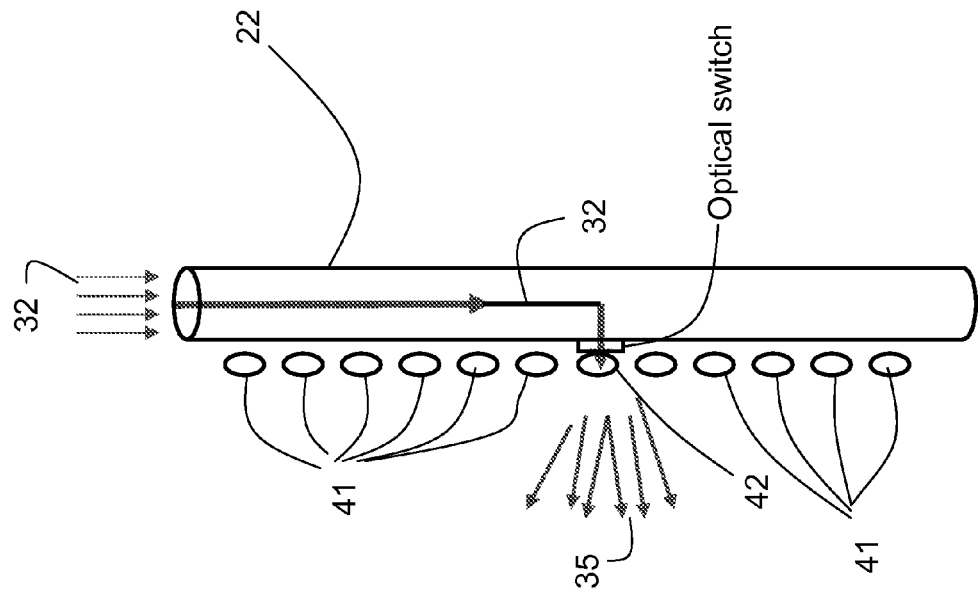
FIG. 6 is a schematic view illustrating the use of row fibers to perform row by row addressing.

FIG. 6 is a schematic view illustrating the use of row fibers 31 to perform row by row addressing. The laser light 32 which travels along a column fiber 22 is unaffected by the presence of "off" row fibers 41 . . . , or those row fibers 31 which do not intercept the evanescent field 20 of the laser light. When it hits a row which intercepts the evanescent field 20, the laser energy is coupled to the row fiber 42 which in turns scatters the laser light 35 towards the viewer. If the width of the row fiber along the direction of the column fiber is long enough, usually an order of magnitude longer than the wavelength of the light wave, depending on the dimension of the air gap, then the coupling of the laser light would approach 100%.

Figure 7:
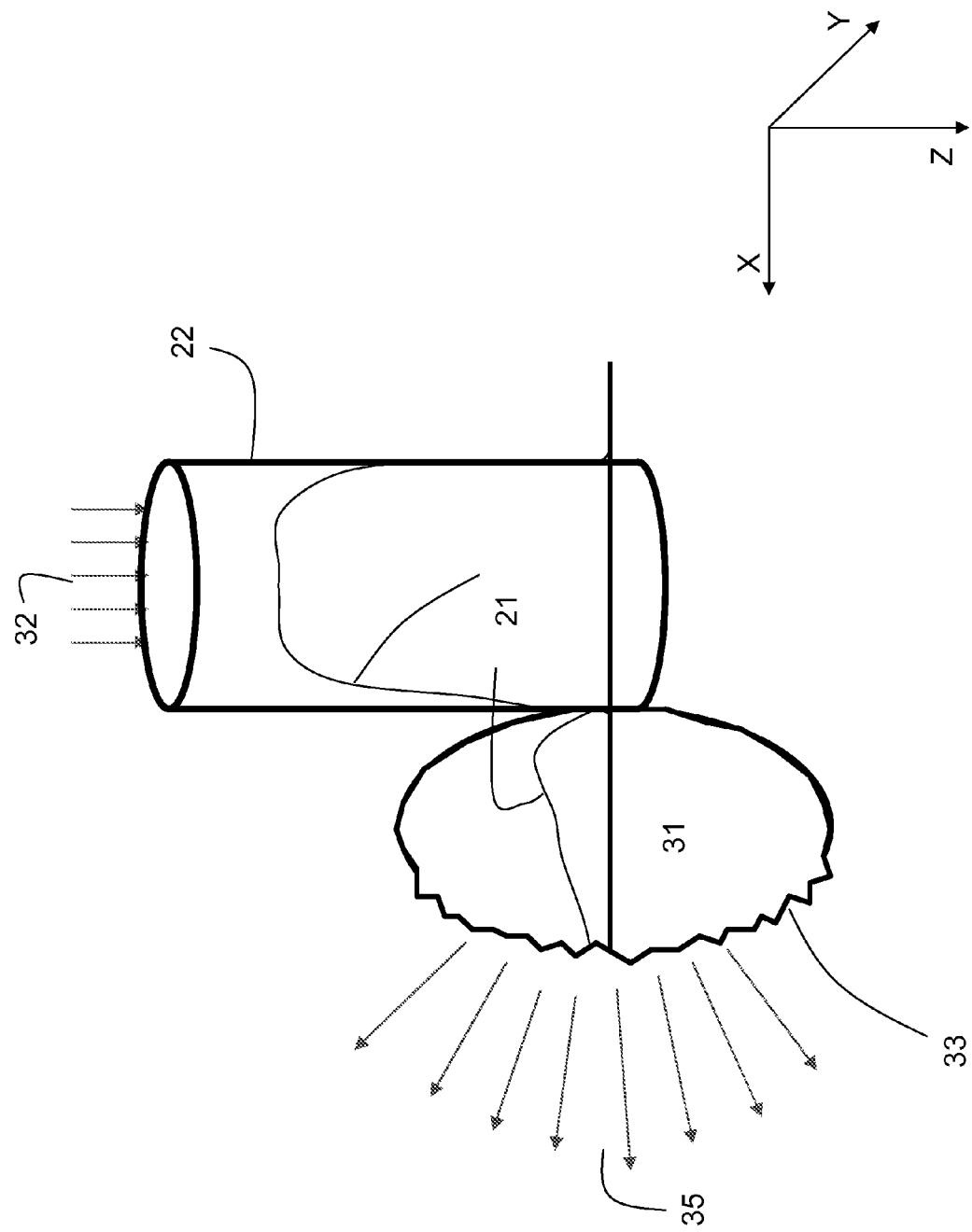
FIG. 7 shows the redirection of the laser light from a column fiber to a row fiber with a random grating etched on its front.

FIG. 7 shows the redirection of the laser light 32 from a column fiber 22 to a row fiber 42 with a random grating 33 etched on its front. The grating 33 causes the laser light 32 to lose confinement, creating a leaky waveguide for the laser light 32. When the row fiber 42 does not touch the column fiber 22, the loss of light confinement is more gradual since the light has to tunnel through the air gap, which is seen as a dip in the light intensity 21 across the air gap. The smaller the air gap is, the smaller the dip in light intensity 21 across the gap, until the dip all but vanishes when the air gap becomes negligible. The random grating 33 on the viewing side scatters the tunneled laser light 32 towards the viewing audience, wherefrom an outgoing wave boundary condition is established for the laser light 32, leading to a rapid coupling of laser energy from the column fiber 22 to the row fiber 42, whence it is emitted.

Figure 8:
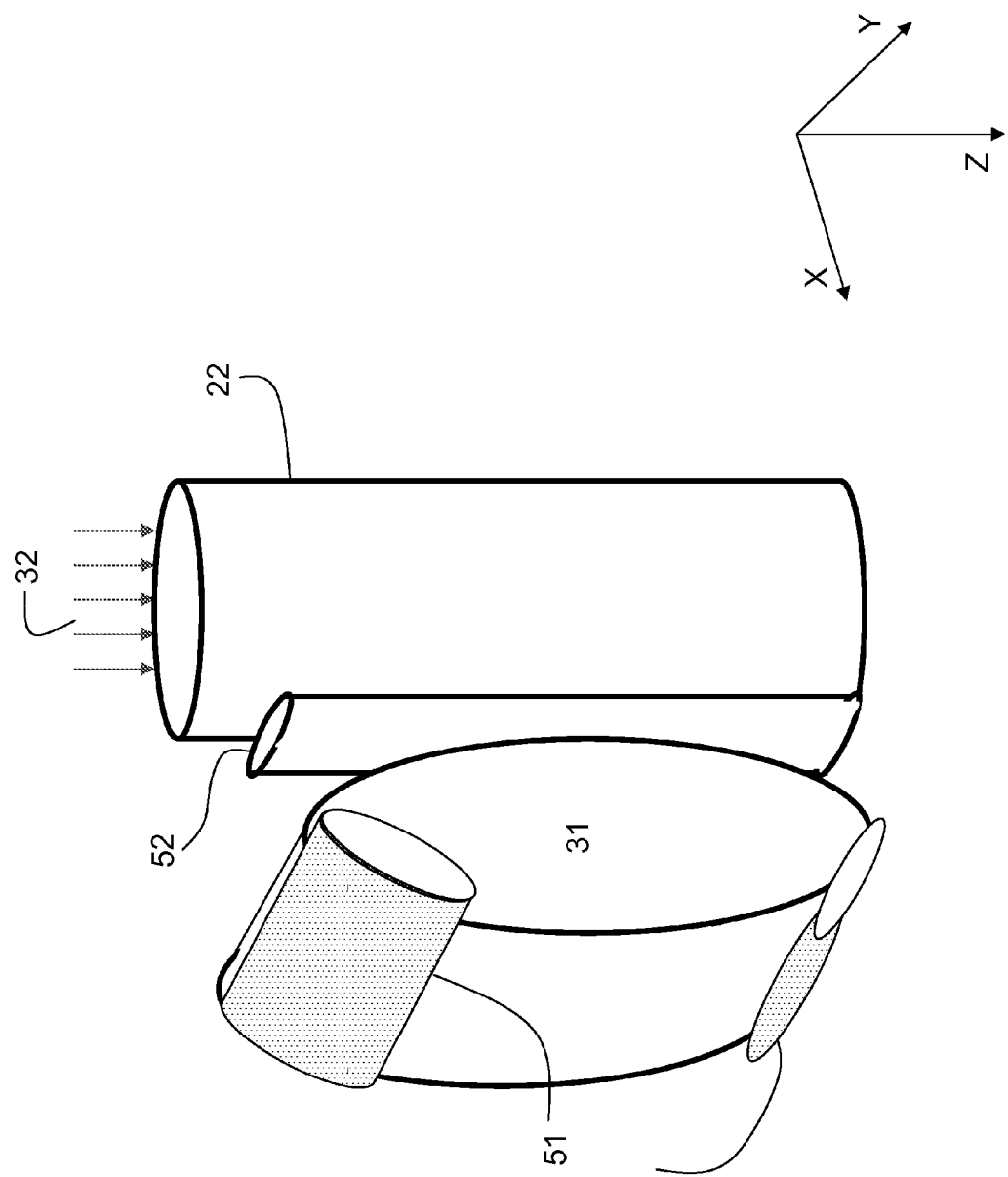
FIG. 8 depicts a possible embodiment of the present inventive concept that employs a piezoelectric transducer and an elastic optical coupler to displace the row fiber toward or away from the column fiber.

FIG. 8 depicts a possible embodiment of the present inventive concept that employs a piezoelectric transducer 51 and an elastic optical coupler 52 to displace the row fiber 31 toward or away from the column fiber 22. There is provided a transparent elastic optical coupling substrate 52 along the entire length of the column fiber 22. The elastic optical coupler 52 has an index of refraction significantly lower than that of the column fiber 22, causing the laser light 32 to be confined primarily inside the column fiber core 22, with a slowly decaying evanescent wave that extends into the elastic coupler 52. The thickness of the optical coupling substrate 52 is chosen so that the evanescent filed 20 that extends beyond the outward facing side of the elastic optical coupling substrate 52 is exponentially small. Each row fiber 31 is nominally pressed against the outward side of the elastic optical coupler 52 gently by a pair of piezoelectric actuators 51 in their off state. When the pair of piezoelectric actuators 51 is turned on, they exert sufficient pressure to cause the row fiber 31 to press hard against the elastic coupler 52, compelling it to become compressed to half of its relaxed thickness or less, whence the tunneling coefficient between the column fiber 22 and the row fiber 31 across the elastic optical coupler 52 increases dramatically. The increased coupling results in the switching of the laser light 32 propagating along the column fiber guide 22 to the row fiber 31 whence it is scattered toward the viewers.

Figure 9:
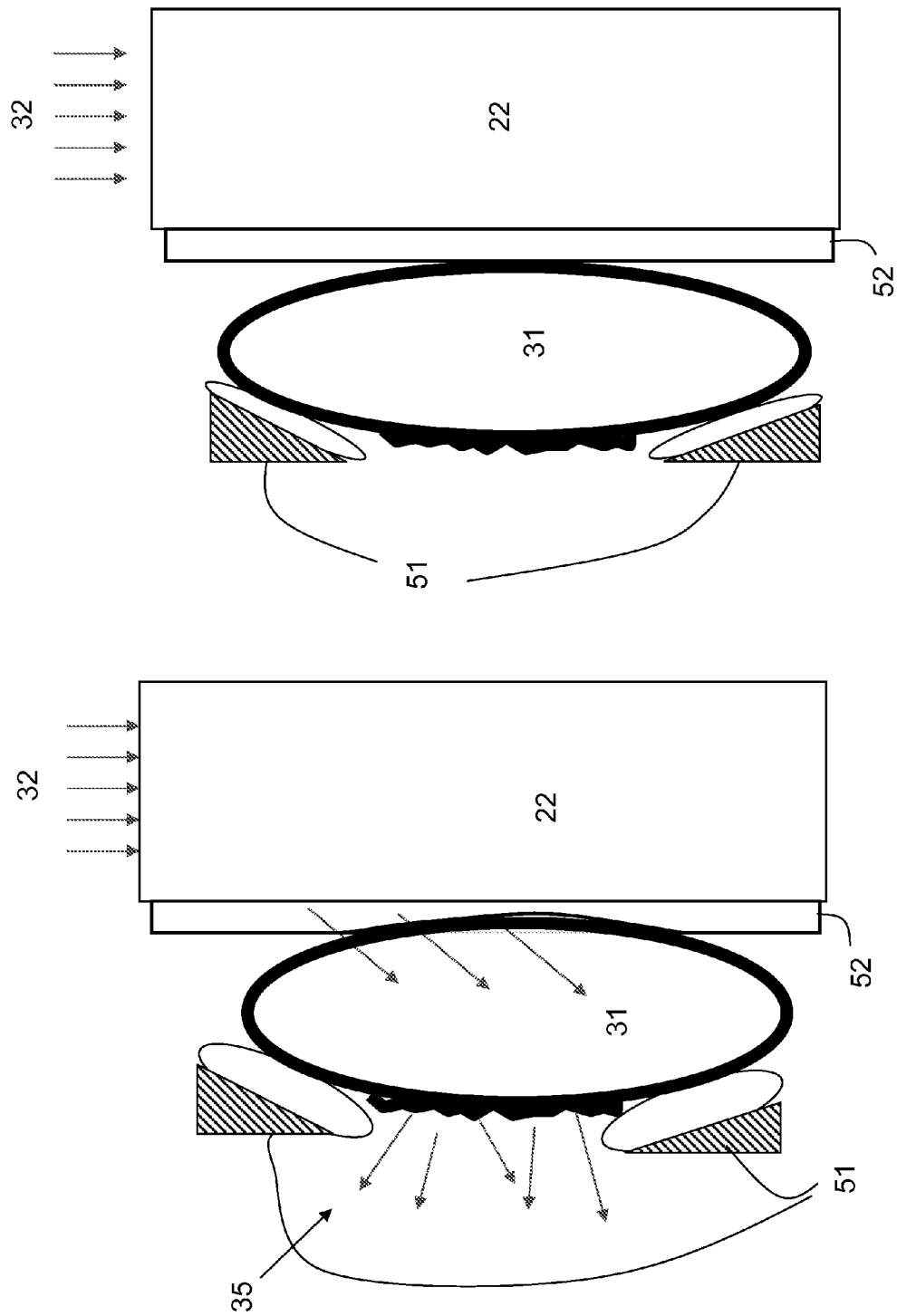
FIG. 9 is a sectional view of the embodiment depicted in FIG. 8.

FIG. 9 is a sectional view of the embodiment depicted in FIG. 8. On the right no voltages are applied to the piezo actuators 51, instead, the pre-compression of the piezo actuators 51 compels the actuators to press the row fiber 31 gently against the elastic optical coupler 52 without compressing the latter. The row fiber 31 is out of reach of the evanescent wave field 20 within the optical coupler 52 and no energy is coupled from the column fiber 22 to the row fiber 31 as a result. On the left, when a voltage is applied to each of the piezo actuator 51, the actuators expand in thickness, forcing the row fiber 31 to press hard against the elastic optical coupler 52, deforming it. The deformation causes the row fiber 31 to move within the evanescent wave field 20 inside the elastic optical coupler 52, allowing the laser light 32 propagating in the main column fiber 22 to leak out to the row fiber 31 which in turns scatters the coupled laser light 35 out toward the viewers.

Figure 10:
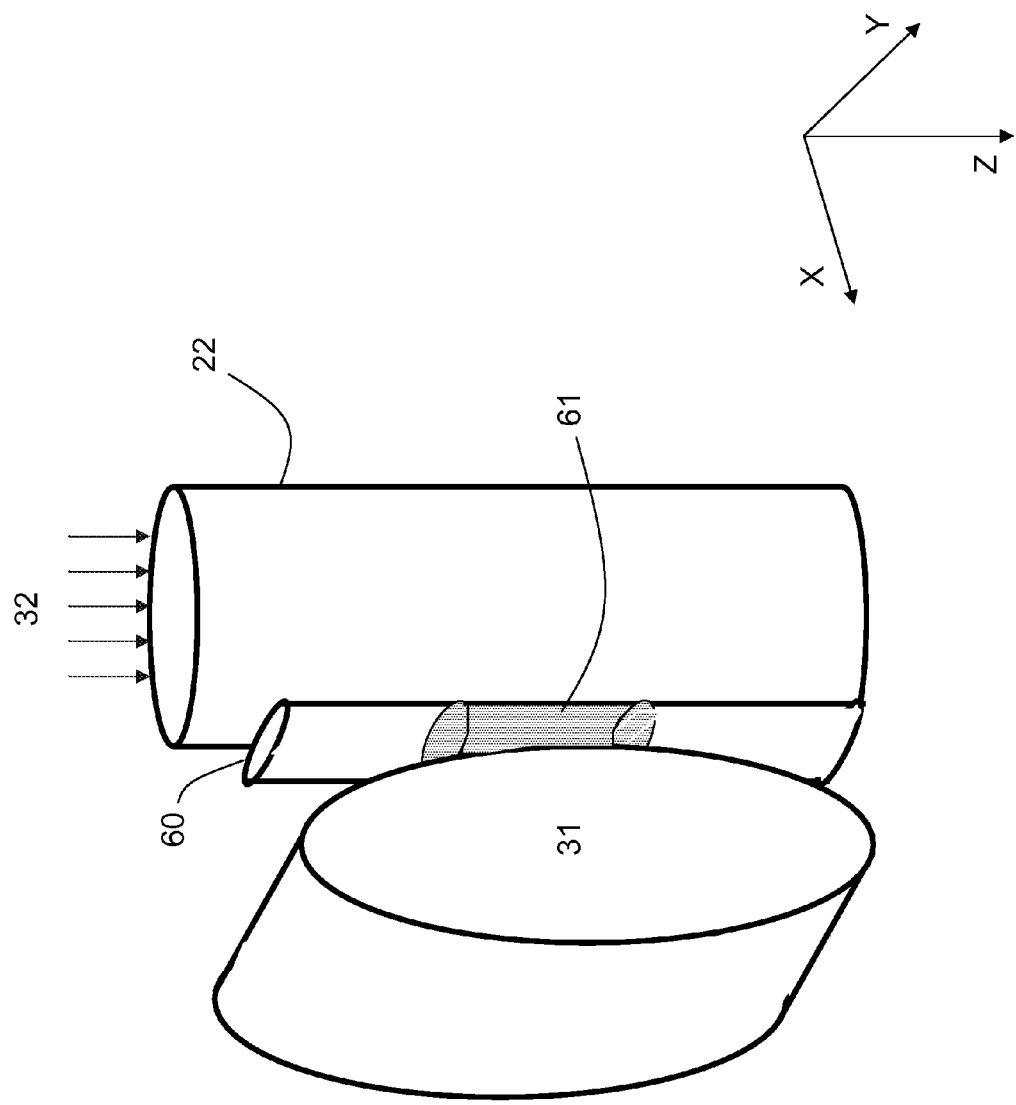
FIG. 10 depicts in an alternate embodiment of the present invention that uses column-wise hollow tubes with transparent fluid droplets as the optical couplers.

An alternate embodiment of the present invention is depicted in FIG. 10. A rigid transparent flat optical tube 60 made from a low index of refraction material sitting between a row fiber 31 and the column fiber 22 is optically connected to both for the entire length of the column fiber 22. The inner tube wall is preferably made of, or coated with, a non-wetting material with respect to a transparent liquid droplet 61 of similar or higher index of refraction and high surface tension. The droplet is propelled at a constant speed maintained by a constant pressure differential down the transparent tube. When the droplet 61 passes the region of the tube that is located right between the intersection of the column fiber 22 and the row fiber 31, the laser light 32 will be coupled to the row fiber 31 provided that the thickness of the tube is sufficiently larger than the evanescent decay length of the air gap but smaller than the evanescent decay length of the liquid filled region. To ensure optimum optical coupling, the length of the liquid droplet 61 should be much larger than the diameter of the column fiber.

Figure 11:
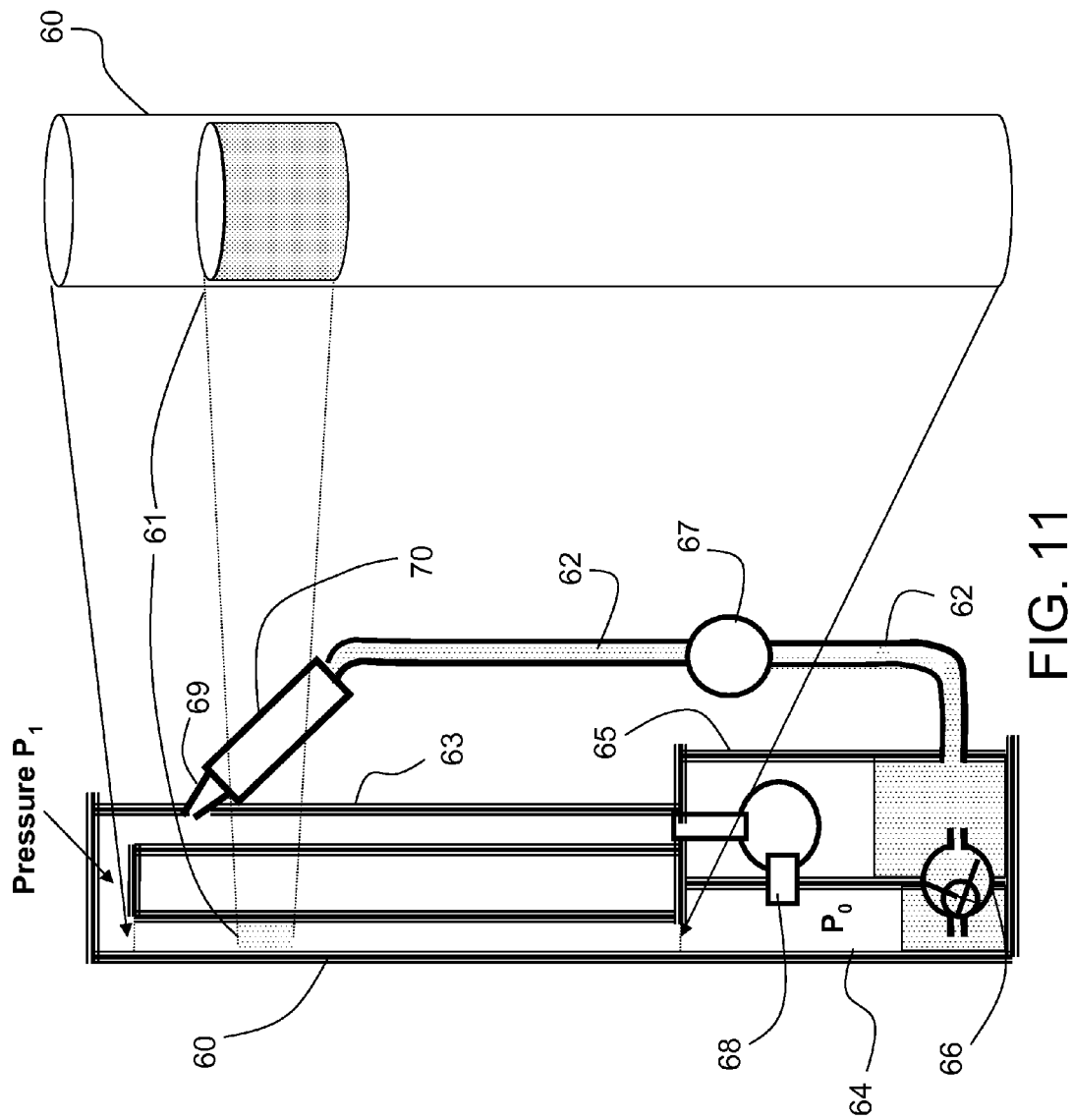
FIG. 11 illustrates, in axial, or longitudinal, section, the transparent tube of the alternative embodiment, as well as the pumping mechanism for the coupling droplet.

FIG. 11 illustrates, in axial, or longitudinal, section, the transparent tube 60 of the alternative embodiment, along with its feed tube 62, and the return air tube 63, as well as two pressure chambers 64, 65, and a plurality of fluid pumps 66, 67 and air pump 68, together with an inkjet injection head 69 and its attendant piezoelectric pump 70. As shown the clear fluid droplet 61 is approximately one forth way from the top of the tube 60, being driven down by a pressure difference $P_1$-$P_0$ maintained by the air pump 68 which inhales the low pressure air from the low pressure chamber 64 and pressurized it to $P_1$. The low pressure chamber 64 also collects fluid dropped from the transparent tube 60. The returned fluid is transported to the second, high pressure chamber 65 by the first fluid pump 66 and ultimately into the feed tube 62 to the intake of the second fluid pumps 67. The second fluid pump 67 pressurizes the fluid and sends the returned fluid to the inkjet injection head 69. The piezoelectric pump 70 of the inkjet head 69 precisely meters and pumps a fixed amount of the fluid to inject a constant size droplet periodically to replace the droplet 61 that just precedes it.

Figure 12:
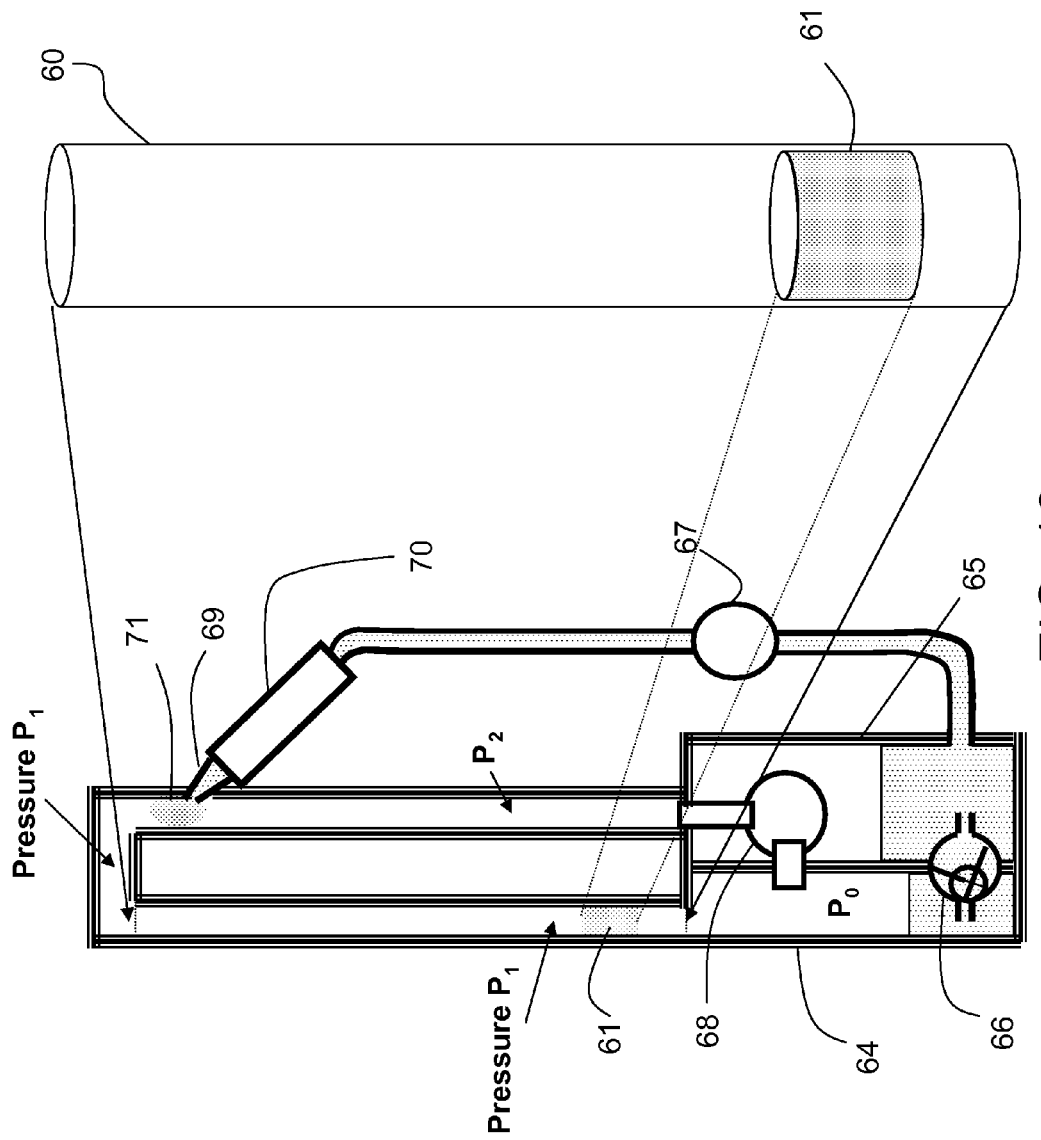
FIG. 12 depicts the onset of the injection of the fluid droplet by the inkjet head of the pumping mechanism.

FIG. 12 depicts the onset of the injection of the fluid droplet 71 by the inkjet head 69. The injection is timed so that the ejected droplet 71 has just enough time to come over the top to appear at the top of the display screen in coincidence with the disappearance of the droplet 61 that precedes it into the low pressure fluid return chamber 64. In order to ensure that the earlier droplet 61 can still maintain its speed even after the injection of the succeeding droplet 71, the air pump 68 must pressurize the air so that the pressure difference is about twice that by the preceding droplet 61. With that, both droplets 61 and 71 will travel at roughly the same speed. Any deviation from that will result in a slight spatial misregistration of the scanned row near the bottom of the display screen.

Figure 13:
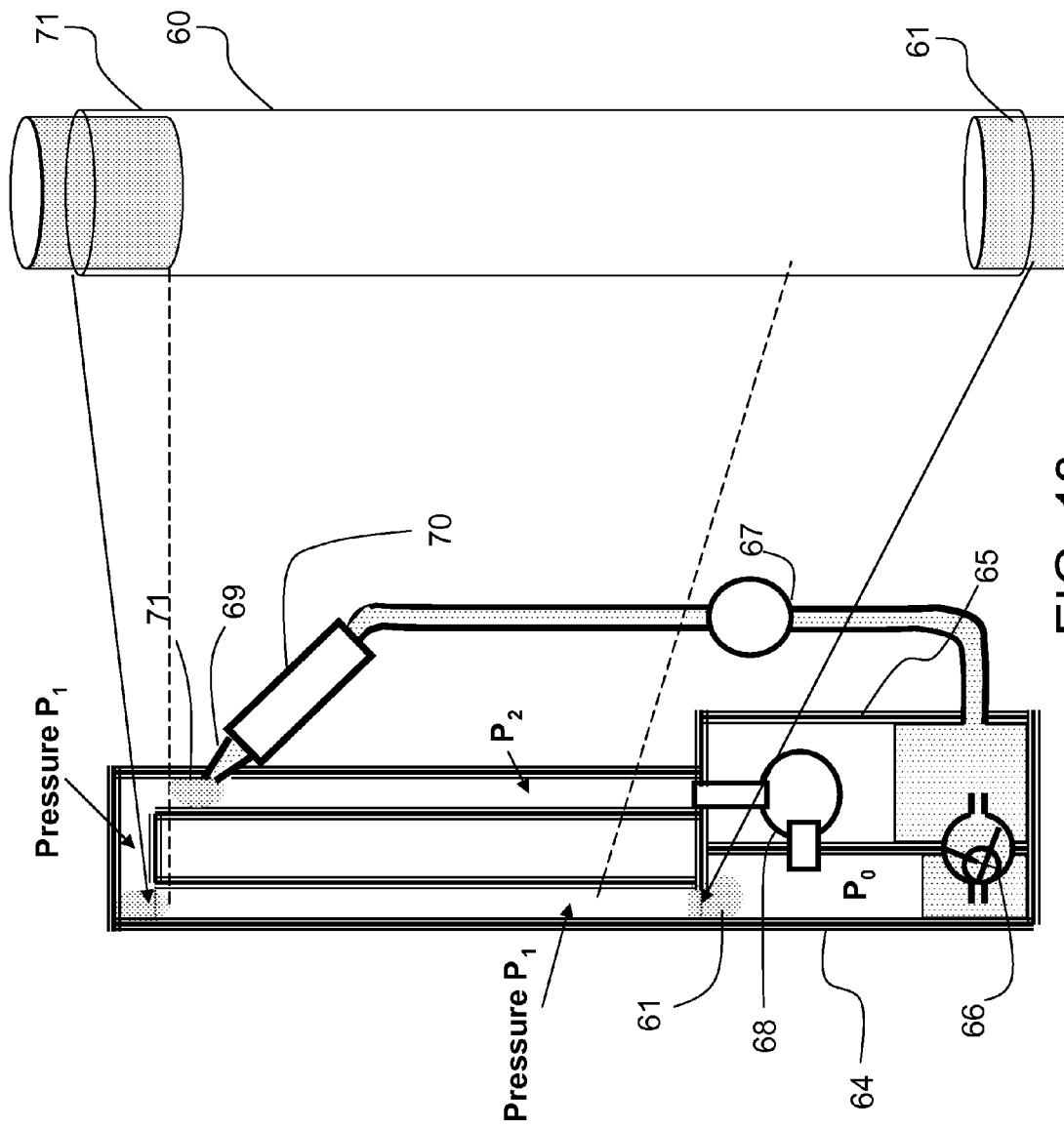
FIG. 13 is a cross sectional view of the droplet about to enter the top of the display screen of the inventive device.

FIG. 13 is a cross sectional view of the droplet 71 about to enter the top of the display screen of the inventive device. Concomitantly, the droplet 61 that precedes it is about to disappear into the low pressure fluid return chamber 64. After the droplet 61 is recovered in the low pressure chamber 64, it is pumped to the high pressure chamber 65. The air pump 68 which was pumping at twice the nominal pressure head will resume pumping at the nominal pressure head immediately after the injected droplet 71 enters the top of the tube. Because of the small distance the just injected fluid droplet 71 has to travel before it enters from the top of the display screen, a slight mistiming would only introduce a slight spatial pixel registration error, which results in a slight distortion of the top and bottom portions of the display screen corresponding to when the two droplets 61 and 71 are being propelled at the same time.

Figure 14:
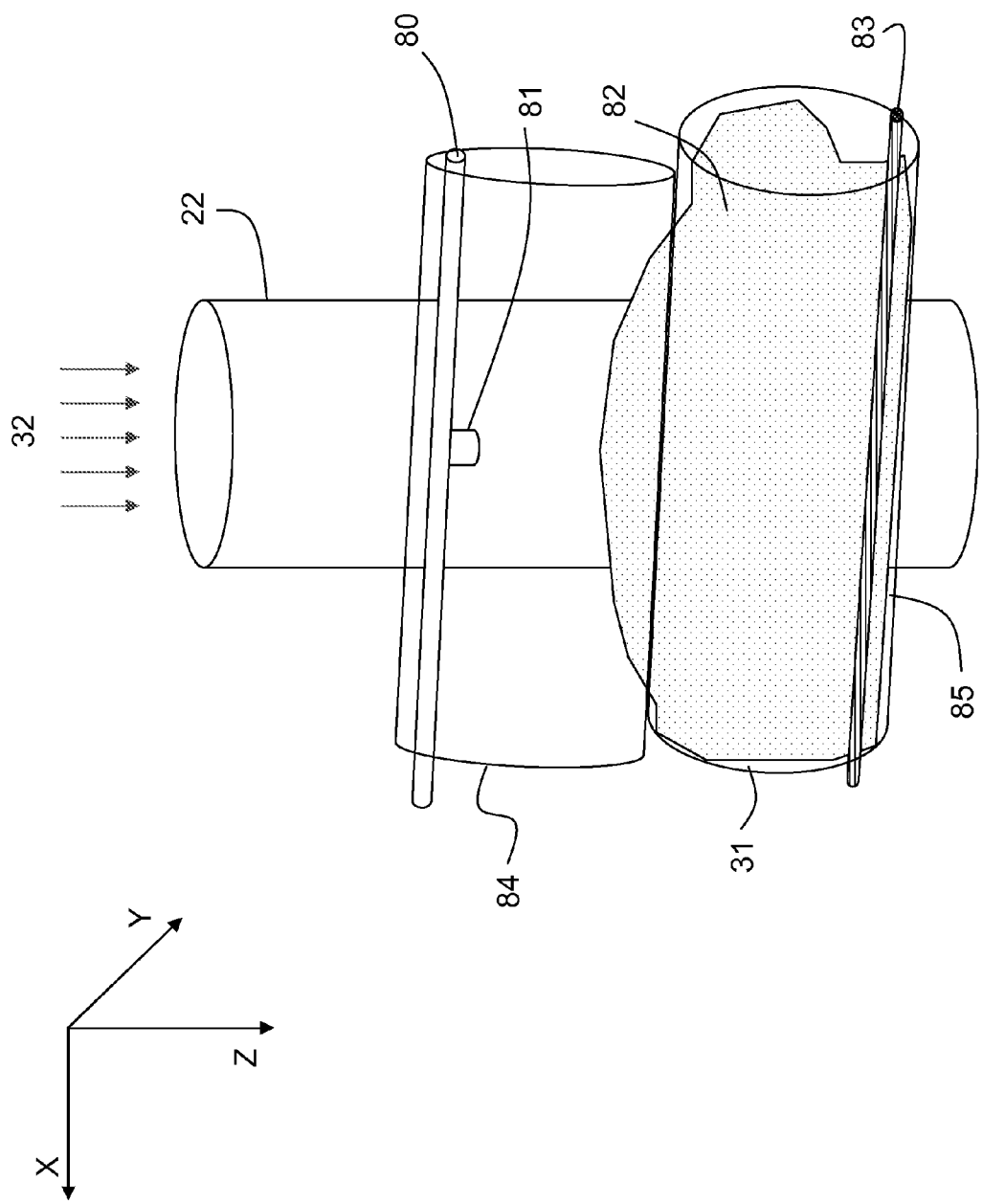
FIG. 14 illustrates yet another alternative embodiment of the present invention. It is based on the electrohydrodynamic principle

FIG. 14 illustrates yet another alternative embodiment of the present invention. It is based on the electrohydrodynamic principle. The electrohydrodynamic (EHD) phenomenon is a result of interactions between a dielectric fluid and an applied electric field. These interactions give rise to the following body forces on the fluid:

The Coulomb force-the force attributable to the electric field acting on free charges in the fluid;

The dielectrophoretic force, which is proportional to the square of the magnitude of the electric field and to the gradient of permittivity of the fluid. (For example, the sharp gradient at a boundary between the liquid and vapor phases of the fluid.); and The electrostrictive force, which is proportional to the gradient of the square of the magnitude of the electric field.

The Coulomb force requires injection of electric charges, or free charges. The dielectrophoretic and electrostrictive forces are both denoted as polarization forces because they are attributable to the interaction between the electric field and polarization charges in the molecules of the fluid.

Associated with each row of the display there is provided a fluidic optical coupling tube 84 oriented in the row direction. The transparent optical coupling tube 84 is connected to and in fluidic communication with an opaque fluid reservoir 85 dedicated only to the optical coupling tube 84 in question. A transparent insulating dielectric fluid 82 is stored in the reservoir 85 with an electrically conducting rod 83 passing through it. A positive voltage is applied to the conducting rod 83 which transfers the positive charges to the dielectric fluid. The inner wall of the optical coupling tube 84 is either made of non-wetting material or has coating that is non-wetting with respect to the dielectric fluid 82. The inner wall of the reservoir tube 85, on the contrary, is wetting. The optical coupling tube 84 also comprises one or more electrodes 81 in its interior. During the "OFF" state, the electrodes 81 are disconnected to a negative voltage source. The Coulomb repulsion of the charged fluid 82 in the reservoir 85 is not sufficient to overcome the surface affinity of the wetting inner wall of the reservoir 85. When a negative voltage is applied to the coupling electrodes 81 in the optical coupling tube 84, the Coulomb attraction force compels the positively charged fluid 82 to move into the lumen of the optical coupler 84, displaying the air that occupied the space. The air bubble moves to the reservoir 85 to replace the depleted fluid volume. The presence of the transparent dielectric fluid 82 with an index of refraction close to that of the column fiber 22 causes the laser light 32 to be switched from the column fiber 22 to the optical coupling tube 84 and subsequently scattered by the undulating grating of the outer surface of the optical coupler 84 on the front side.

Figure 15:
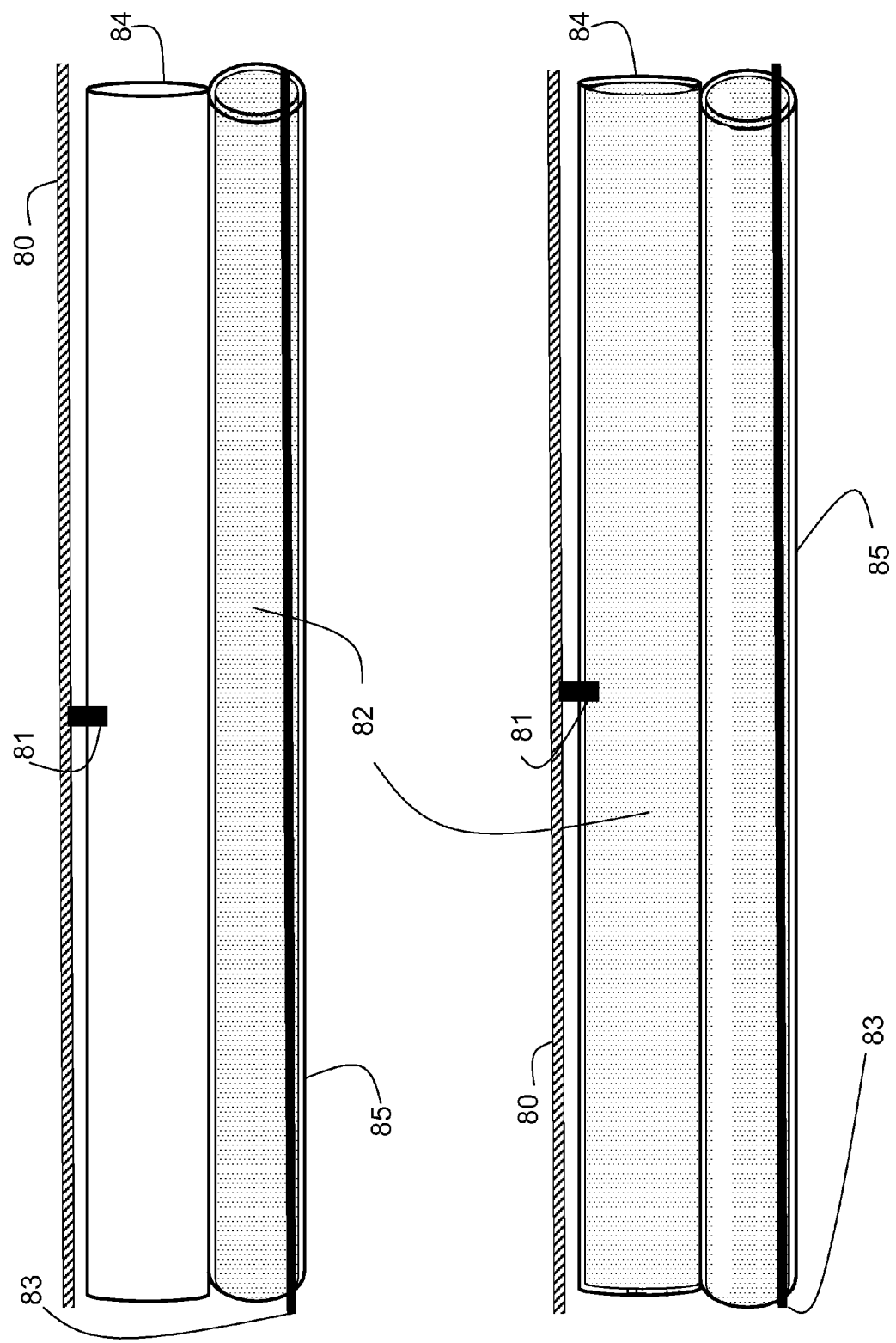
FIG. 15 is another view of the alternative embodiment of FIG. 14.

FIG. 15 is another view of the alternative embodiment of FIG. 14. The charged fluid 82 in the "OFF" state is held within the reservoir 85 by the wetting surface force of the reservoir wall, the repulsive force of the non-wetting optical coupler tube 84 wall. In the "ON" state, the charged dielectric fluid 82 is attracted by the cathodes 81 to move into the inner lumen of the optical coupler tube 84, displacing the air into the reservoir chamber 85.

Figure 16:
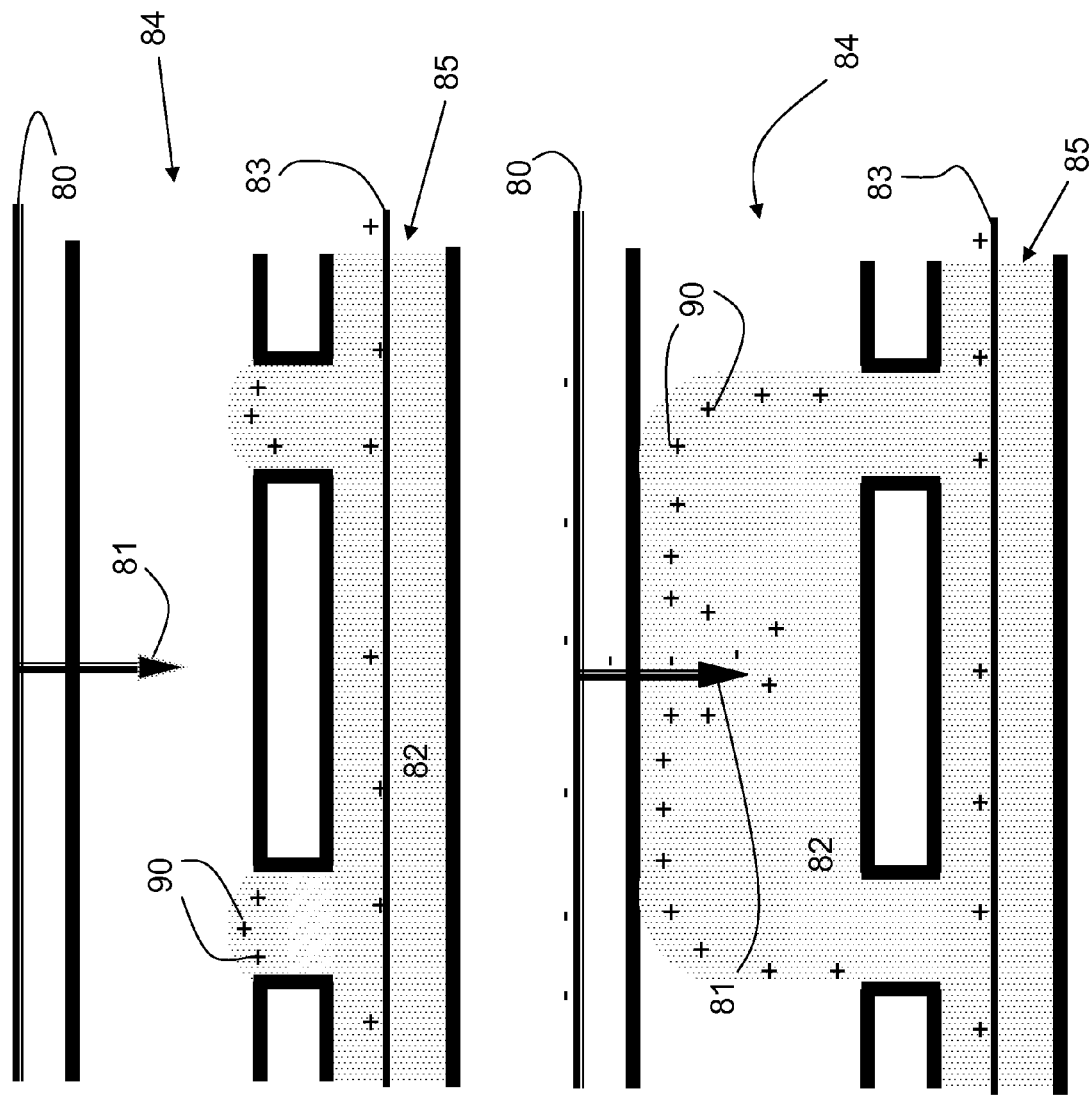
FIG. 16 depicts the process in which the charged fluid switch from one configuration to another under the influence of the voltage applied to the cathode tip.

FIG. 16 depicts the process in which the charged fluid 82 switch from one configuration to another under the influence of the voltage applied to the cathode tip 81. When the cathode 81 is disconnected from the negative voltage supply, it becomes "floating", meaning that its voltage is determined by the condition that no current can flow into or out of the cathode 81. In this state the cathode 81 behaves just like an insulator and there is no Coulomb attraction between the cathode 81 and the charged fluid 82, hence the charged fluid 82 remains in the reservoir cavity 85. The slight bulging of the fluid 82 at the fluid air boundary is because of the Coulomb repulsion of like charges on the fluid boundary. When the cathode 81 is connected to the negative voltage supply, the negative charges accumulate at its tip exert a Coulomb attractive force to compel the positively charged fluid 82 to fill the cavity of the fluid coupler tube 84.

Figure 17:
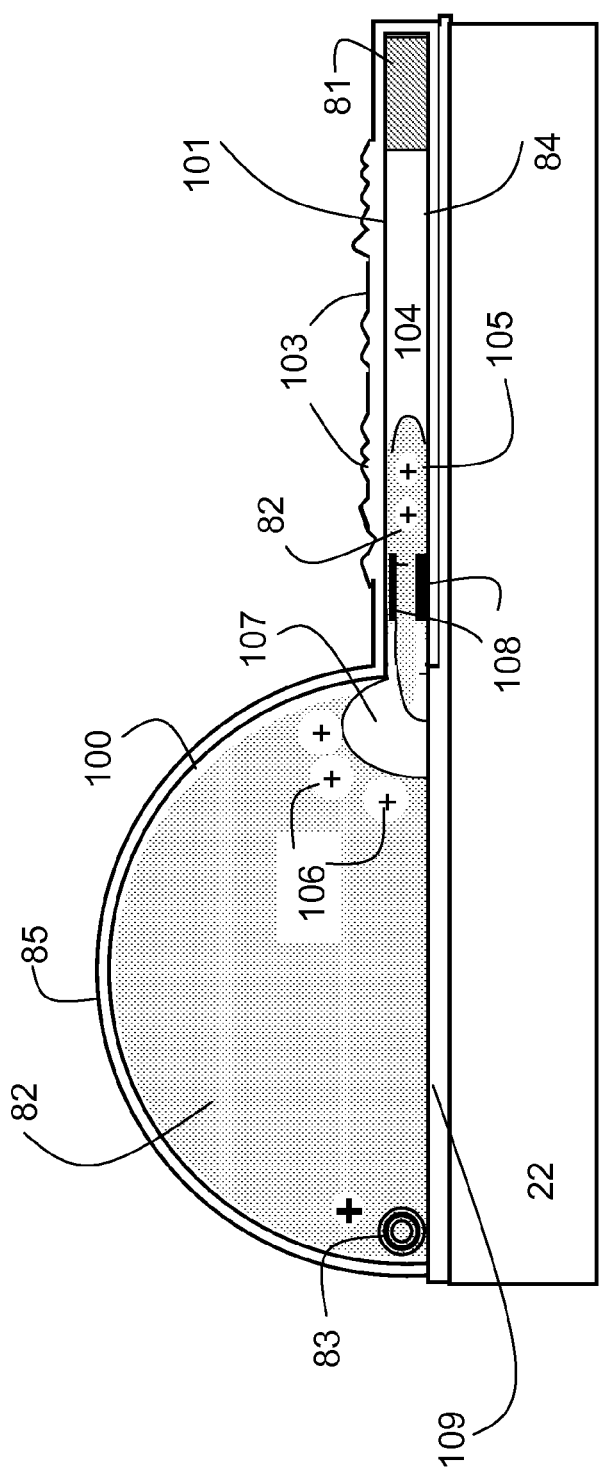
FIG. 17 illustrates, in a section that is axial to the column fiber, the construction of the optical coupler of an alternative embodiment of FIG. 14.

FIG. 17 illustrates, in a section that is axial to the column fiber 22, the construction of the optical coupler of an alternative embodiment of FIG. 14. In addition to the anode 83, which is situated at the distal end of the reservoir 85, and the cathode 81, which is at the proximal end of the optical coupling tube 84, there is provided a pair of switching electrodes 108 near the neck of the optical coupling tube 84. As shown, the optical coupling tube 84 is much smaller in volume than the reservoir 85, and its outer surface 103 facing the viewers is corrugated to scatter laser lights coupled by the presence of the dielectric fluid 82 in the coupling tube 84. The positively charged dielectric fluid 82 in the reservoir 85 has an acute contact angle with respect to the wetting reservoir wall 100. In the "OFF" state, both the switching electrodes 108 and the cathode 81 are floating (electrically), the charged fluid 82 is entirely inside the reservoir 85, with an air bubble 104 that extends from the mouth of the reservoir 85 to the entire lumen of the optical coupling tube 84. The switching electrodes 108, being close to the air fluid interface 107, can exert a large Coulomb force when they are turned on the application of a negative voltage to them. Under the Coulomb pull of the switching electrodes 108, a small portion of the charged fluid 82 gets separated from the rest and moves into the optical coupling cavity 84. The cathode 81 is then turned on to pull the separated charged bubble 105 toward it, forcing the air 107 that originally occupies that region to move to the reservoir region 85. The process continues until the optical coupling tube region 84 is filled with the transparent charged fluid 82. To turn the row "OFF", the cathode 81 is applied a positive voltage to repel the charged fluid 81 from the coupling tube 84, and then the switching electrodes 108 are turned first to positive and then off to allow the expelled fluid 105 to join the charged fluid 82 still in the reservoir 85.

Although the switching electrodes 108 illustrated are opaque and narrow, they could just as well be replaced by transparent electrodes which cover the entire face of the coupling tube. The advantage of this alternative approach is a lower applied voltage requirement, especially if the dielectric fluid is a strong polar fluid.

Still another variation of the embodiment is to replace the reservoir wall with electret material with positive bound charges on the inside of the reservoir cavity, and dispense with the anode. An electret is a type of insulating material, typically a polymer, that has been polarized by the application of a high strength electric field under elevated temperature condition and can retain a permanent electric dipole. It is an electric equivalent to a permanent magnet. The positive surface charges of the electret can induce a polarization field in the dielectric fluid such that the negative polarization charges are localized on the interface between the fluid and the electret wall, and positive polarization charges appear on the free surface (the boundary between the fluid and the air). The positive polarization charges on the free surface can be manipulated by the switching electrodes and cathode the same way as before.

A fourth possibility is to replace the reservoir cavity wall with material that sits higher on the triboelectricity scale than that of the dielectric liquid. Because of the quantum mechanical tunneling phenomenon that is responsible for triboelectricity, the fluid would be charged negative even without the anode which can be dispensed with.

Figure 18:
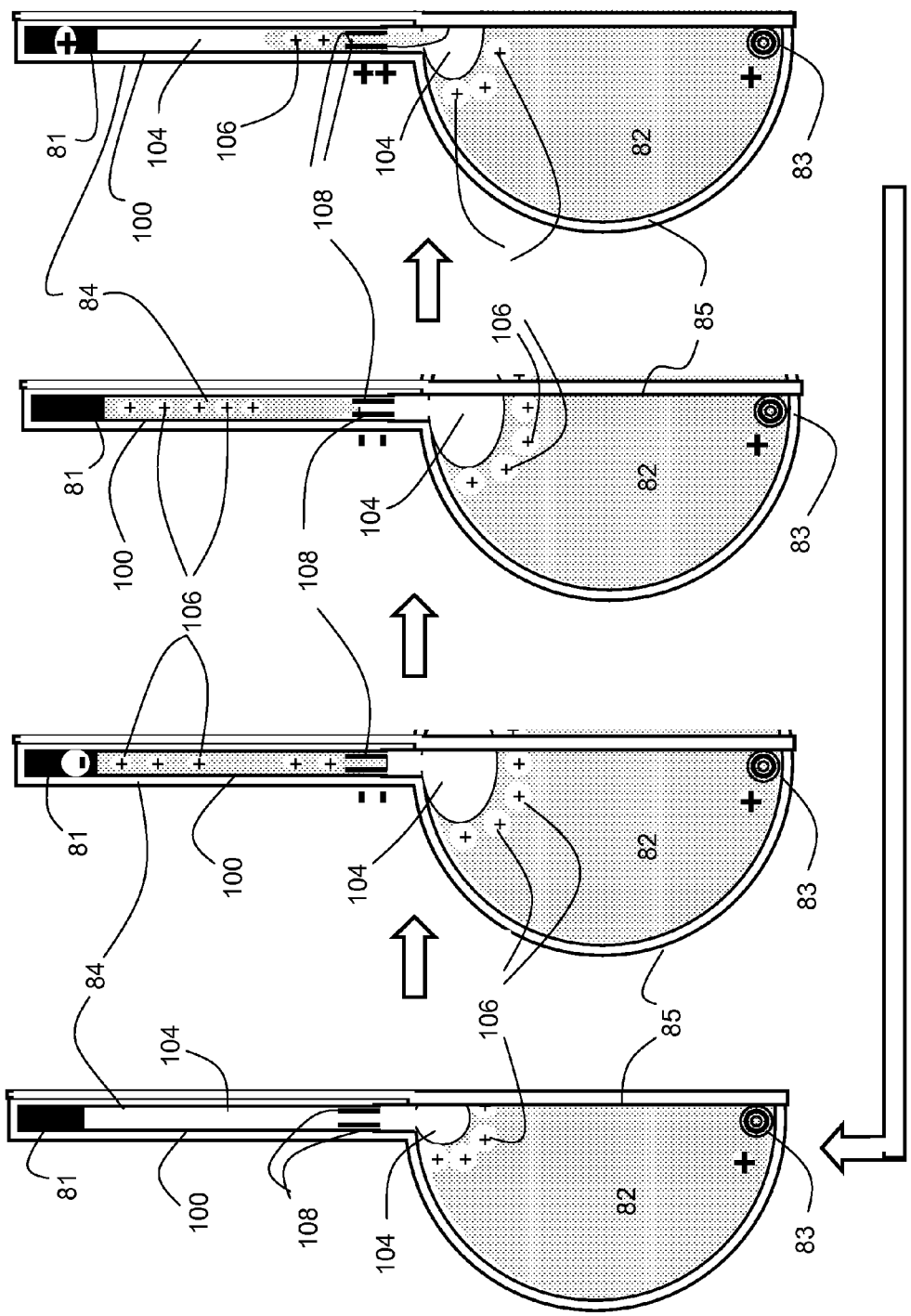
FIG. 18 shows the switching sequence of a particular row in the embodiment depicted in FIG. 17.

FIG. 18 shows the switching sequence of a particular row. The dielectric fluid 82 is charged by the anode 83 that spans the entire length of the reservoir tube 85. Initially no voltage is applied to the cathode 81 and the switching electrodes 108, and the charged fluid 82 lies entirely within the reservoir 85, away from the non-wetting surface of the coupling tube wall 100. This is the lowest energy state of the micro-fluidic system which is dominated by capillary effect and surface tension. Subsequently the switching electrodes 108 and the cathode 81 are applied a negative voltage, which draws a portion of the charged fluid 82 into the lumen of the coupling tube 84. To switch off, both the switching electrodes 108 and the cathode 81 are applied a positive voltage briefly to expel the charged fluid 82 from the coupling tube region 84 back into the reservoir 85. Once the separated charged fluid 82 rejoins the rest of the fluid inside the reservoir 85, both the cathode 81 and the switching electrodes 108 are disconnected to maintain the charged fluid 82 in the reservoir 85. Since both the pair of switching electrodes 108 and the cathode 81 are insulated electrodes, there are no DC current flows. Transient, AC currents only flow when the individual electrodes are switched to various voltages. The power supplied by the transient current flows is used primarily to offset the friction and viscous effects of the fluid movement during the transitional periods. Since each row coupler is turned ON and OFF only once per frame and since the range of the fluid movements is of the order of 10 microns, the average power required for row switching can be minimized by adjusting the voltage applied to each electrode to the lowest value without violating the switching time requirements. Higher applied voltages cause the fluid to move faster, hence more heat dissipation loss. It is also essential to limit the fluid Reynolds number to be below 100 to avoid settling oscillations of the fluid bubbles.

Figure 19:
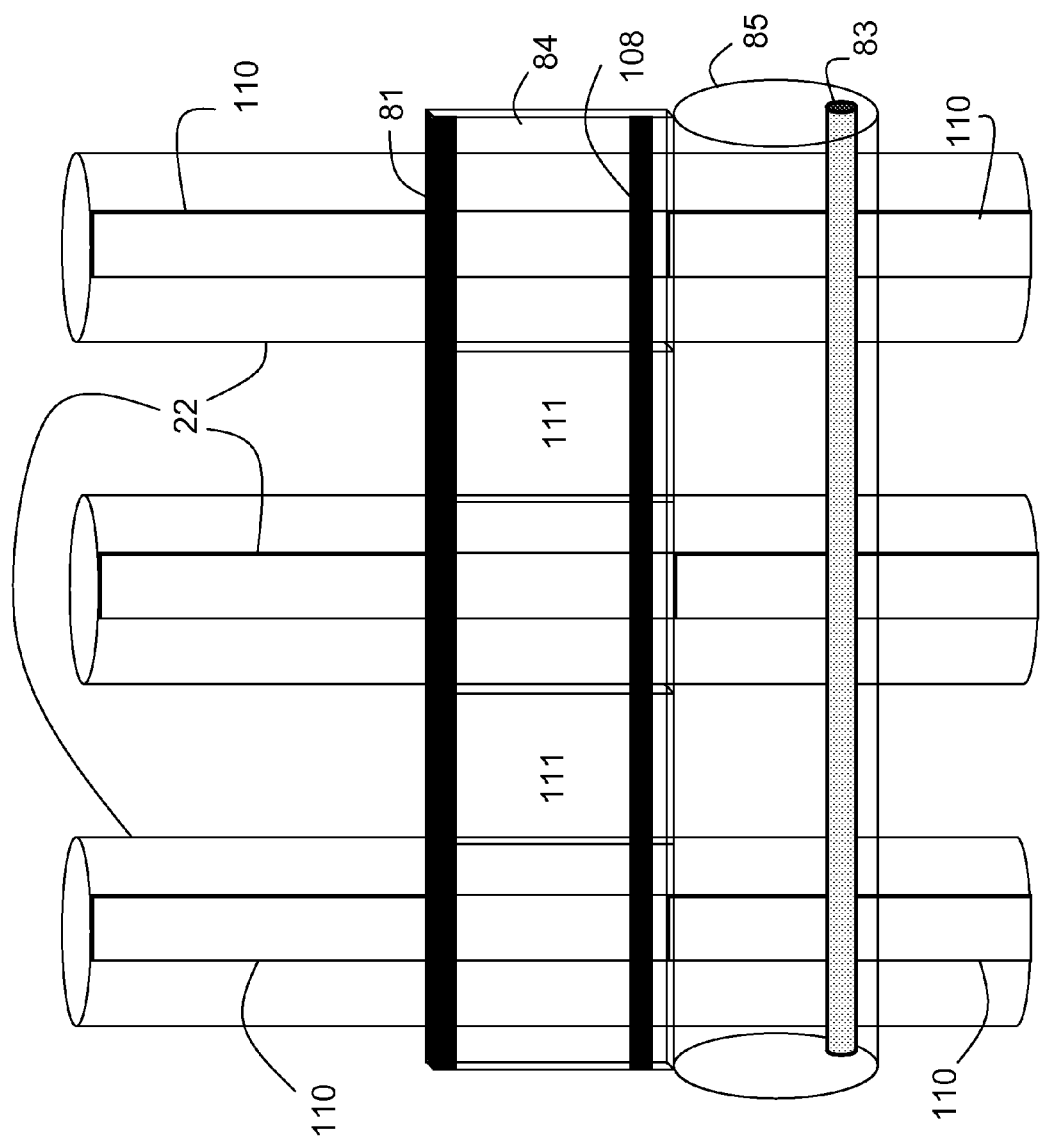
FIG. 19 depicts another view of the embodiment delineated in FIG. 17.

FIG. 19 depicts another view of the embodiment delineated in FIG. 17. As shown, a single optical coupler (coupling cavity 84 and reservoir 85) can be used to switch the laser lights propagating in the column fibers 22 simultaneously for that particular row. To prevent cross pixel coupling which reduces dynamic contrast ratio, barriers 111 are inserted inside the optical coupling cavity between any two adjacent column fibers 22. The barriers 111 block the entrance of the dielectric fluid to the region of coupling cavity 84 between two adjacent column fibers 22 to prevent light leaking from one column fiber 22 to the next.

Optical compensators 110 are also used to maintain the continuity of the single mode waveform to minimize longitudinal laser scattering loss due to any sharp discontinuity of the single mode waveform. The transverse waveform of the single mode column fiber is determined by the geometry of the column fiber cross section as well as by the variation of the index of refraction. The attachment of the optical coupler 84 to a column fiber 22 will slightly alter the shape of the transverse waveform of the laser light from that before the attachment. The compensator 110 is used to maintain that waveform between two optical couplers 84. A compensator 110 comprises of a thin slab of substrate with an identical index of refraction as that of the coupling cavity 84, as well as a thickness that nearly match that of the wall of the coupling cavity 84. The side of the compensator slab that is facing the column fiber 22 is curved to accommodate the curvature of the column fiber surface, and the other side is flat. The compensator 110 also extends behind the optical coupling cavity 84 to shim the gap between the backside of the coupler 84 and the column fiber 22.

Figure 20:
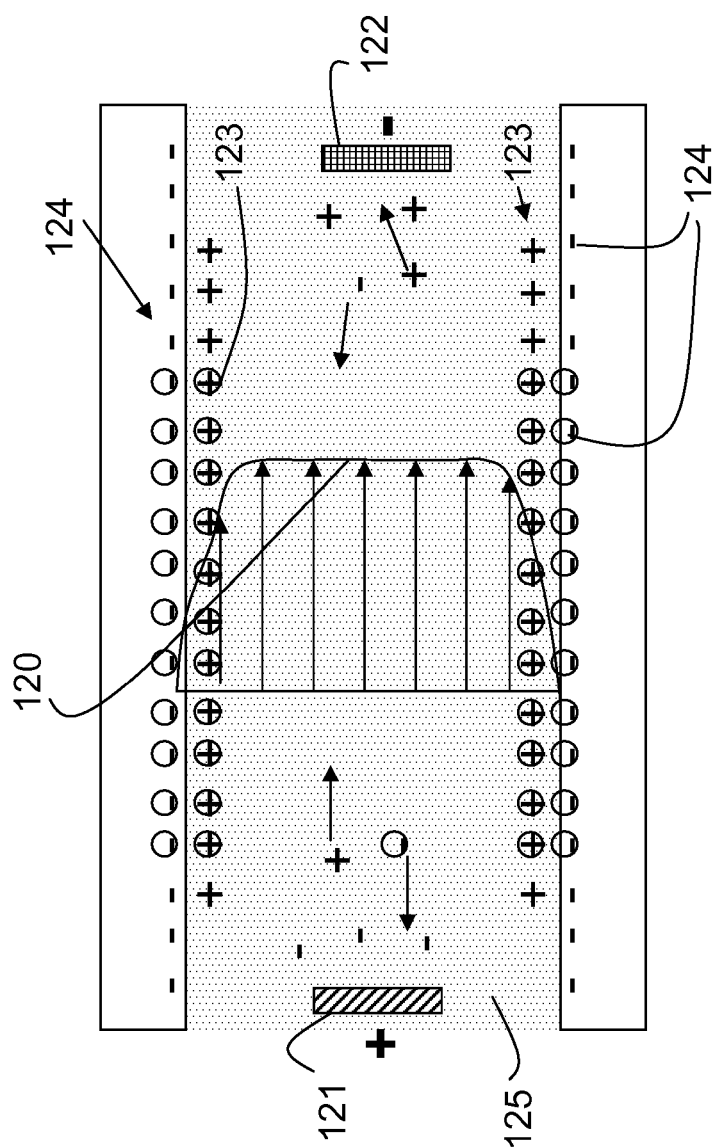
FIG. 20 illustrates still another embodiment that utilizes electrokinetic force of an ionized electrically conducting fluid to perform the laser light switching.

FIG. 20 illustrates still another embodiment that utilizes electrokinetic force of an ionized electrically conducting fluid 125 such as water instead of insulating dielectric fluid to perform the laser light switching. A substrate such as glass acquires negative surface charges when it is brought into contact with the ionized fluid. The negative surface charges 124 of the substrate in turns attract positive ions and repel negative ions or electrons within the fluid to form a thin boundary layer of positive boundary charges 123 of roughly the thickness of a DeBye length, which is typically of the order of a few tens of nanometers to hundreds of nanometers. When an external electric field is established by, for example, a cathode 122 and an anode 121, the positive boundary ions 123 respond to the electric field by moving toward the cathode 122, carrying the neutral bulk fluid with them. This phenomenon is known as electroosmosis, and has been used to construct micro-fluidic pumps for medical and scientific applications.

Electroosmosis can generate pressure head that is several times the atmospheric pressure, which is clearly more than adequate for moving the fluid in and out of the optical coupling cavity. The down sides are twofold; first, since both the cathode and the anode need to be immersed in a conducting fluid, there is a DC current even when there is no fluid movement; hence it consumes electricity at drastically higher rates than that of the dielectric fluid approach. Second, when the ions are neutralized at the electrodes, then become gases through electrolysis which must be either removed or recombined, thus it entails extra processes which make the electroosmosis approach more complex and inefficient. However, for very large size displays, the ability of the electroosmosis force to generate a large pressure head would make it attractive despite all its attendant complications.

When an optical grating that is aligned parallel to the column fiber and is placed within the evanescent decay field of the laser light, a Bragg scattering of the laser light ensues, provided that the grating spacing falls within certain limits. When the grating spacing falls just outside of one of the two limits, no Bragg scattering is possible. This fact can also be used to construct a laser light switcher.

Figure 21:
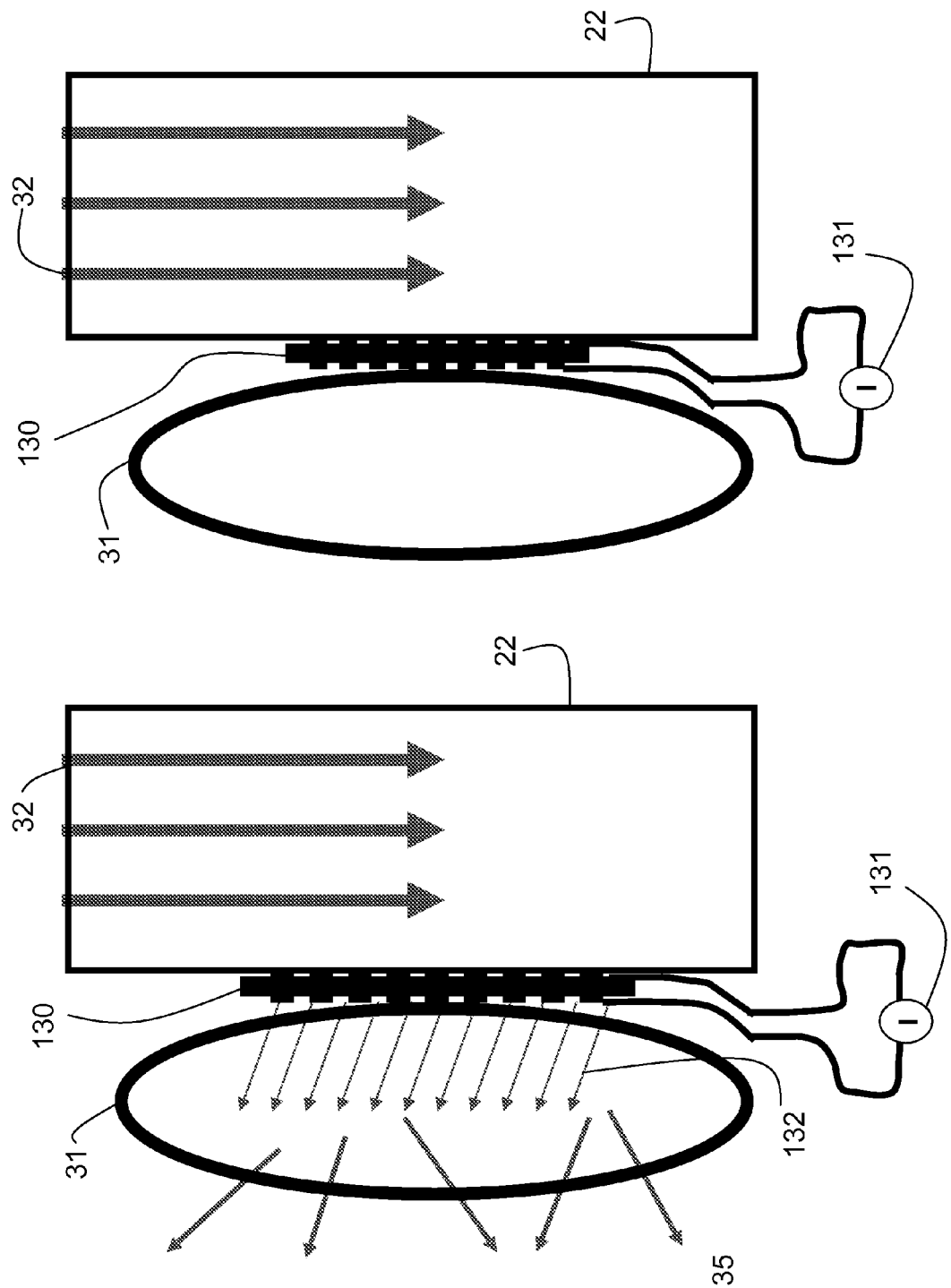
FIG. 21 depicts one embodiment of thermal optical grating.

FIG. 21 depicts one embodiment of the thermal optical grating concept. A small resistive heating element, not shown, is embedded into each grating 130 so that when the grating 130 is unheated, the grating spacing falls just short of the Bragg limit. Once heated by passing a current 131 through the heating element, the grating 130 expands to increase the spacing just above the Bragg limit and the thermal grating Bragg scatters the laser light 32 into the row fiber 31 which in turns scatters it toward the viewer. The role of the row fiber 31 is to uniformly scatter the Bragg scattered laser light 132 to create a wide viewing angle for the display since the initial Bragg scattering produces only a single narrow beam.

Thermal expansion of a few percents is easily achievable with a temperature change of 50 degrees (Celsius) or so. However, the variation in room temperature could change the switching threshold. A better approach is to use shape memory alloys with a temperature threshold high enough to avoid unwanted switching. Another issue is the cooling speed. Shape memory alloys need fast cooling time for rapid response. To switch 1000 rows every 1/60 of a second, the switching speed must exceed 60 KHz. Hence for fast, high resolution displays, shape memory alloy is not the proper choice.

Figure 22:
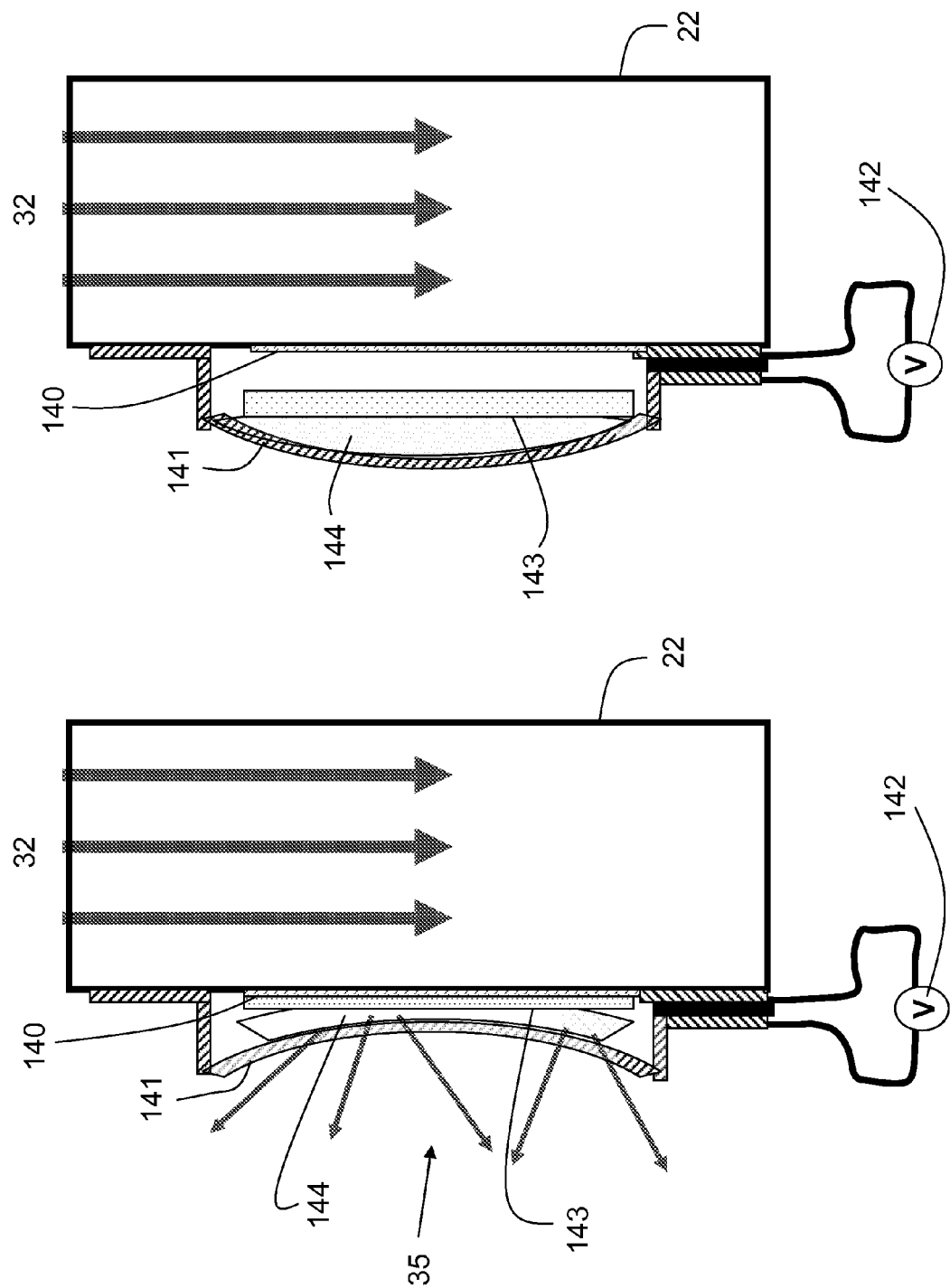
FIG. 22 illustrates one such embodiment of optical switch active addressing using electret actuated optical coupler.

Another actuation method is to use an electret film. Electret is a polymer film with permanently polarized charges across its thickness direction. FIG. 22 illustrates one such embodiment. As shown, the electret film 141 is adhered to a transparent elastomer slab 144 which in turns is glued to an index of refraction matched optical substrate block 143. The elasticity of the elastomer slab 144 is so chosen as to make the electret film assembly 141 bistable, with one stable state with an air gap between the column fiber 22 and the optical matching block 143 larger enough to prevent laser light coupling, and the other stable state with the matching block 143 nearly touching the column fiber 22. The electret can change states by the presence or absence of the applied voltage 142 between a transparent electrode 140 attached to the column fiber 22 and another transparent electrode, not shown, glued to the front face of the electret film 141. Electret has excellent frequency response, well in excess of 60 KHz required for switching a thousand rows at 60 frames per second. The drawbacks with this approach are the finite lifetime of the electret material (typically several years) and the high frequency acoustic noise the movements of the electret switches generate.

Figure 23:
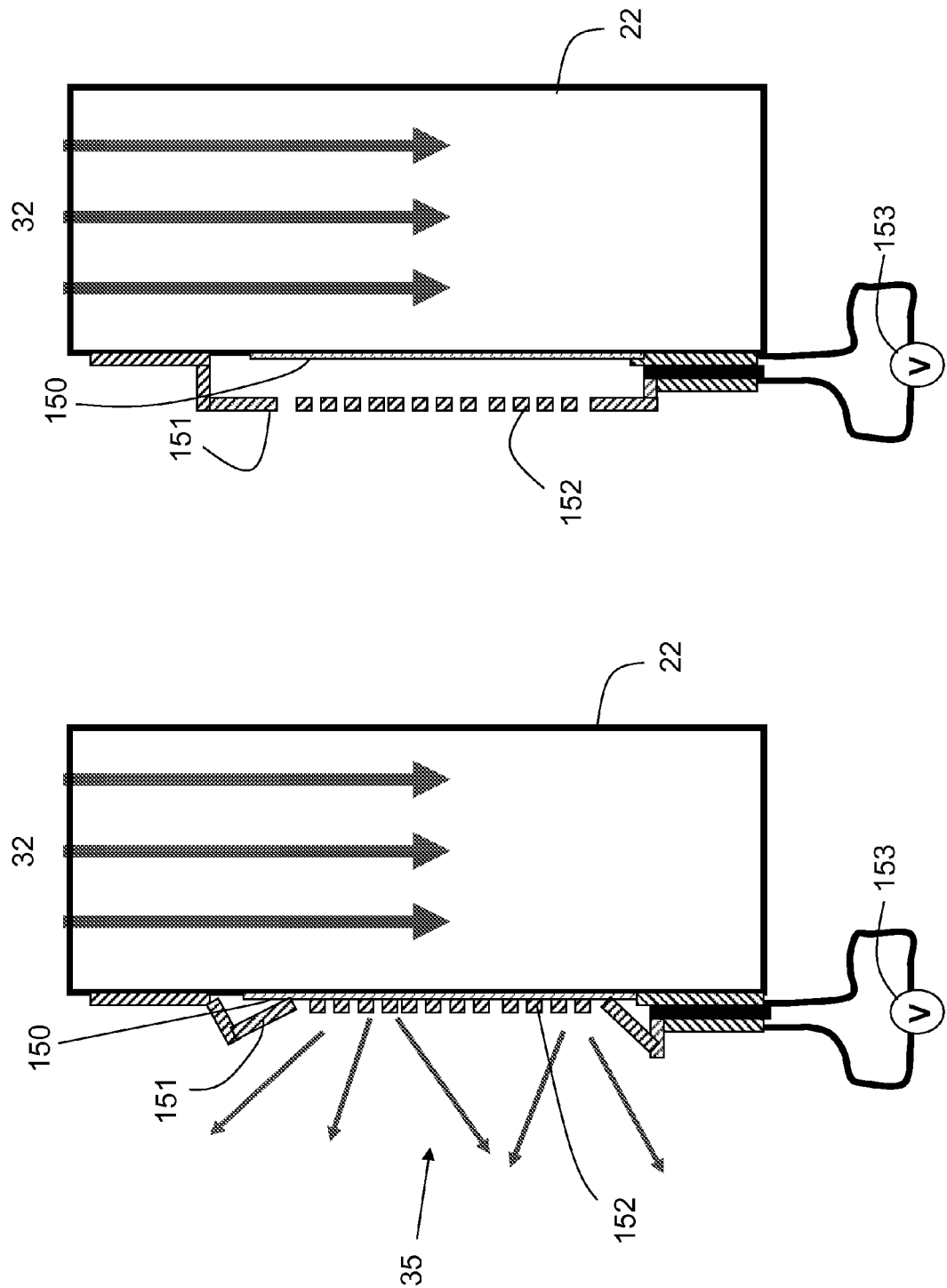
FIG. 23 illustrates one such embodiment of optical switch active addressing using electret actuated optical grating.

To further improve electret's high frequency response as well as to reduce switching power consumption, the elastomer/index matching block combination can be replaced with a thin film optical grating, as depicted in FIG. 23. A pair of transparent electrodes 150 are glued to the face of the column fiber 22 as well as the electret grating 151. The electret is actuated under the application of the electric field 153 to alternatively pull the grating 152 in to bring it in contact with the column fiber 22 or to move the grating 152 away from the column fiber 22 by a distance which is greater than the evanescent decay length of the laser light 22. The grating spacing is chosen to produce the maximum Bragg scattering, and a diffuser is used to randomize the scattered direction to broaden the viewing angle of the display.

Figure 24:
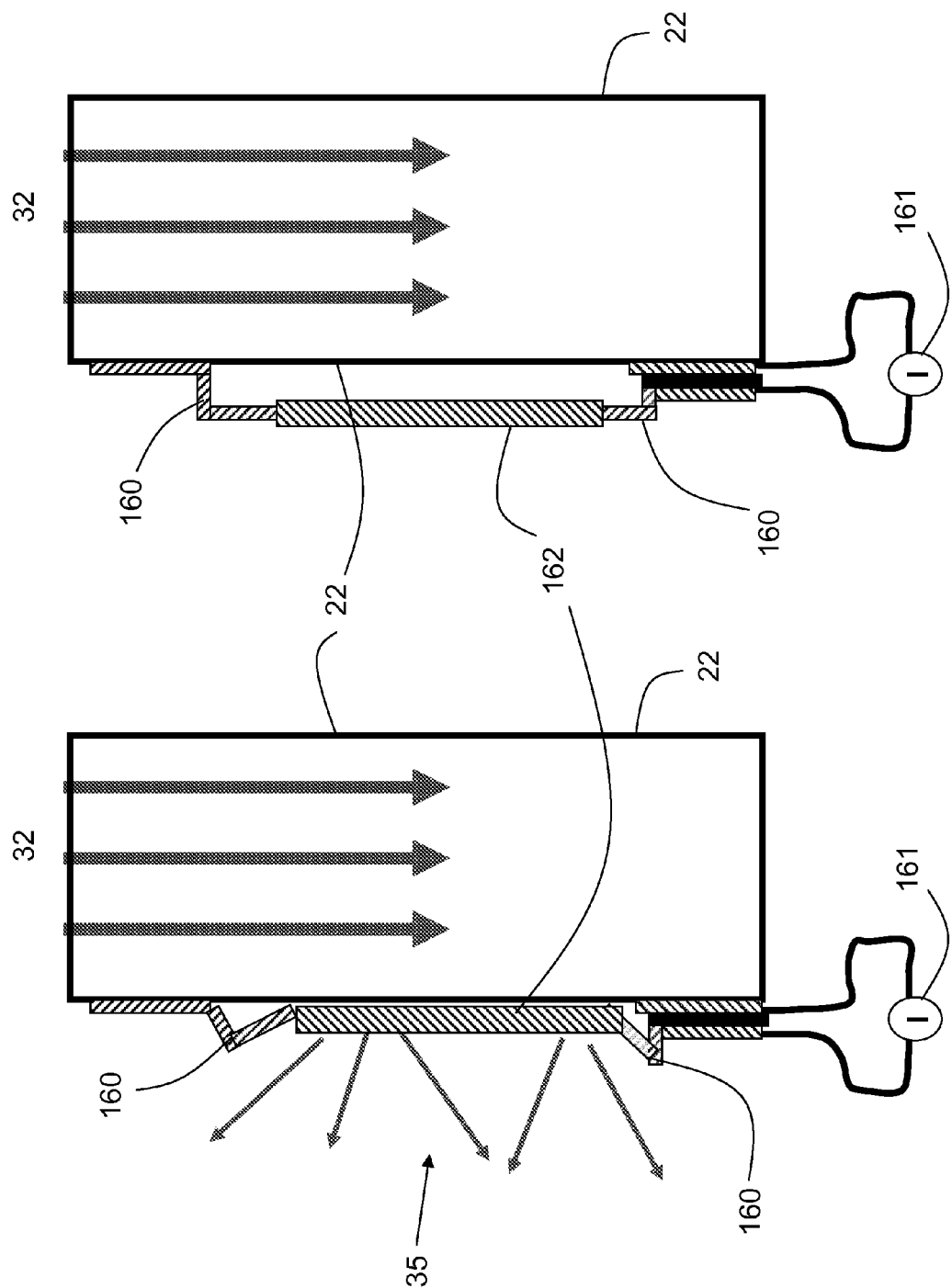
FIG. 24 illustrates one such embodiment of optical switch active addressing using shape memory alloy actuated optical coupler.

The actuation can also be performed by a shape memory alloy, as shown in FIG. 24, where an index of refraction matched transparent block 162 is actuated by the shape memory metal 160 to bring it in contact with the column fiber 22. The shape memory metal is annealed to the "close" position when the temperature exceeds the threshold temperature (but below the annealing temperature). The temperature of the shape memory alloy is increased by passing a current 161 through it. The shape memory actuator 160 also includes a membrane spring which keeps the actuator in the "open" position when no current flows through the shape memory alloy. To minimize power consumption, the "close" position corresponds to the position in which the refraction index matching block 162 is in contact with the column fiber 22.

Piezoelectric ceramics such as lead zirconate titanate (PZT) which is a binary solution of $PbZrO_3$ and $PbTiO_3$, or piezoelectric copolymers such as PVDF (Polyvinylidene Fluoride) can also be used for actuation of the optical coupling elements. In additional to PZT, other known piezoelectric ceramic materials are $LiNbO_3$, $BaTiO_3$, lead magnesium niobate, lead titanate etc. PZT, however, is the most frequently used piezoelectric ceramic material because of its excellent physical characteristics. PZT typically has a maximum strain of around 0.15% in the expansion mode ($d_{33}$ strain), which means a 0.2 mm PZT stack can displace a maximum distance of approximately 0.3 microns, which is sufficient for switching optical couplers. Such stack would be useful for stationary display screens, but the 0.2 mm thickness of the PZT stack would make it hard to construct a flexible large screen display. Additionally, to reach the maximum displacement requires a rather large applied voltage even with the "low voltage" ceramic actuator which utilizes multi-layer architecture to reduce voltage requirement. Ceramic piezoelectric transducers are also fragile and typically posses high acoustic impedance which requires a rather complex damping and impedance matching techniques to induce broadband signals.

Polymer piezoelectric materials are flexible, and have inherently low noise, low impedance, and intrinsic damping characteristics which make them more suited for high frequency, broadband tasks without the need of complex drivers. Piezoelectric polymers are ferroelectric polymers produced by various techniques, including, for the case of PVDF, mechanically drawing the polymer and polarized it under the influence of a strong cross electric polarization field. The drawing techniques include extrusion and stretching and, without drawing, PVDF shows only a weak piezoelectric behavior. Strong polarization field leads to higher alignment of the PVDF molecules along the polarization direction. After polarization, PVDF exhibits strong piezoelectric response. Other known piezoelectric polymers are polyparaxylene, poly-bischloromethyuloxetane, polyvinyl fluoride, synthetic polypeptide, polysulfone, aromatic polyamides, cyanoethul cellulose etc. PVDF films used for broadband transducers are typically in the range of 9 to 20 microns in thickness and have very low impedance, making them attractive to medical ultrasound imaging. The flexibility of the polymer piezoelectric materials allows the fabrication of broadband transducers in a wide variety of shapes for a whole host of specific applications.

An alternative to a piezoelectric stack actuator is a piezoelectric bimorph actuator, which uses a pair of piezoelectric thin films mechanically connected together to form a multilayer thin film structure. When one of the piezoelectric films is actuated in the expansion mode, and the other is actuated in the contraction mode, then the differential transversal movement causes the bimorph to bend. Bimorph actuators amplify the displacement by a factor that is roughly half the ratio of the length of the bimorph to the on-center spacing of the two piezoelectric films. So for example, if the on-center spacing between the two piezoelectric films is 10 microns, and the length is 0.06 mm, then the bimorph would require ⅓ the applied voltage to achieve the same displacement and will add negligibly to the thickness of the display when configured properly.

Figure 25:
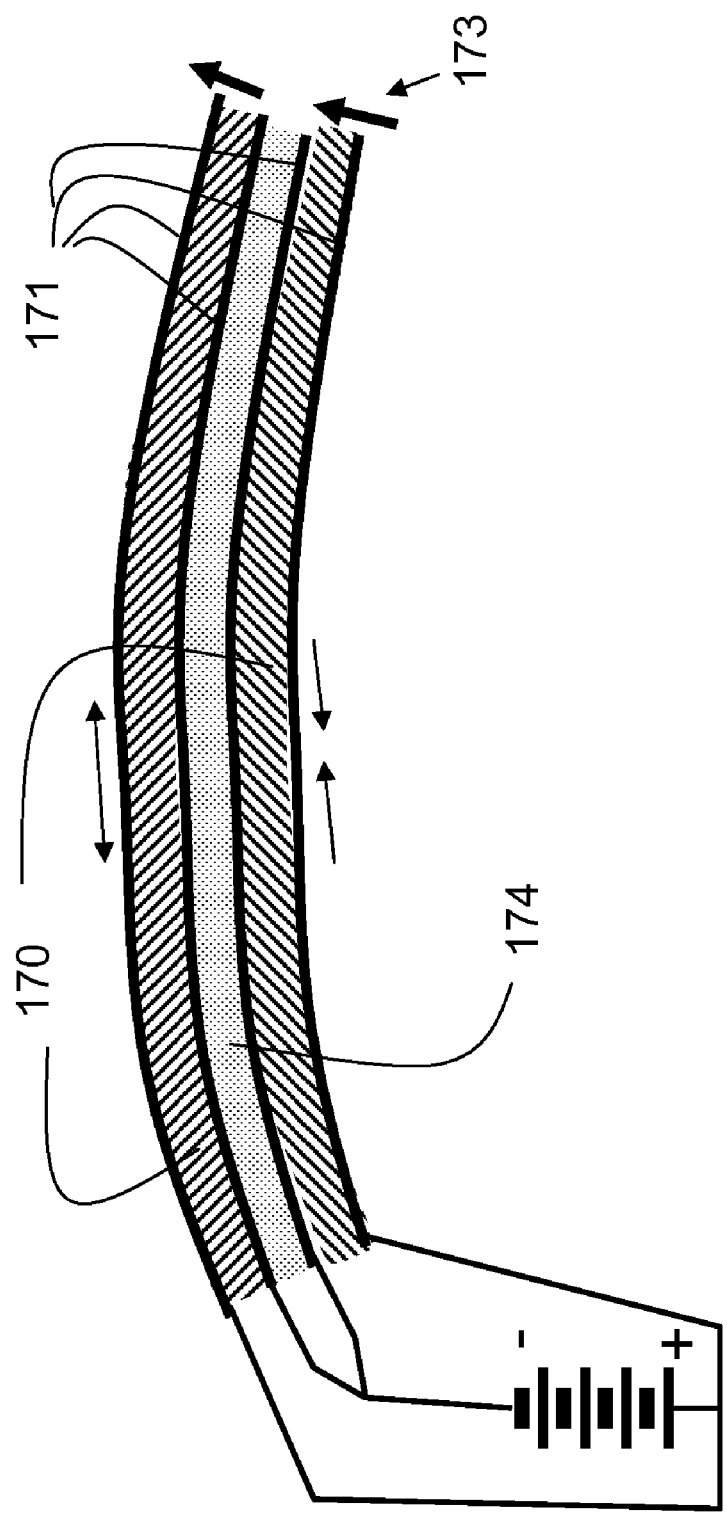
FIG. 25 depicts the construction of a prior art piezoelectric bimorph.
Figure 26:
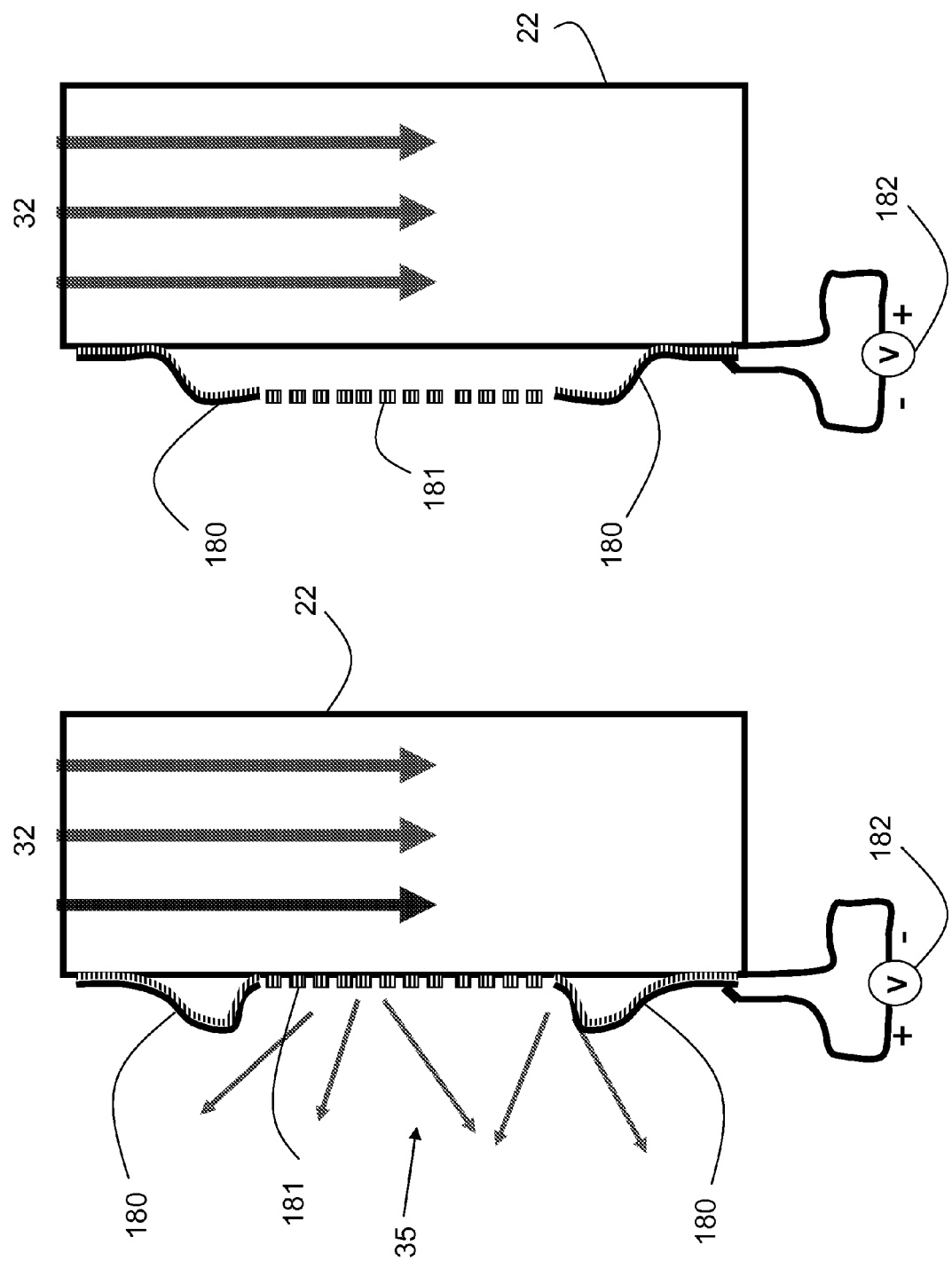
FIG. 26 illustrates one embodiment of optical switch active addressing using piezoelectric bimorph actuated Bragg grating.

Thus the thickness of the actuator as well as the applied voltage requirement can be drastically reduced by using a piezoelectric bimorph construction, shown in FIG. 25. A piezoelectric bimorph actuator consists of a thin passive springy beam 174 sandwiched between layers of piezoelectric ceramic materials 170 such as PZT or piezoelectric polymer materials such as PVDF. The polarizations 173 of the two piezoelectric films are both perpendicular to the surfaces of the films and are parallel to each other. When opposing voltages are applied to the two ceramic layers 170, which are covered on both faces with conducting, preferably metallic films 171, a bending moment is induced in the beam. A pair of cantilevered piezoelectric bimorph actuators 180 can be used to displace a lightweight random Bragg grating 181 as shown in FIG. 26. The spacing of the Bragg grating 181 is uneven but falls within the Bragg scattering window to allow random Bragg scattering to broaden the viewing angles without the need of a separate diffuser screen. The springy support membrane beams of the piezoelectric bimorph actuator pair 180 are shaped as to admit a bistable configuration. By applying various voltages 182 on the piezoelectric films, the piezoelectric bimorph actuators 180 can be either in the "open" or "closed" position. Unlike shape memory alloy based actuators but similar to electret based ones, the piezoelectric bimorph actuators do not require power to be in either bistable positions. They only consume power during switching.

Figure 27:
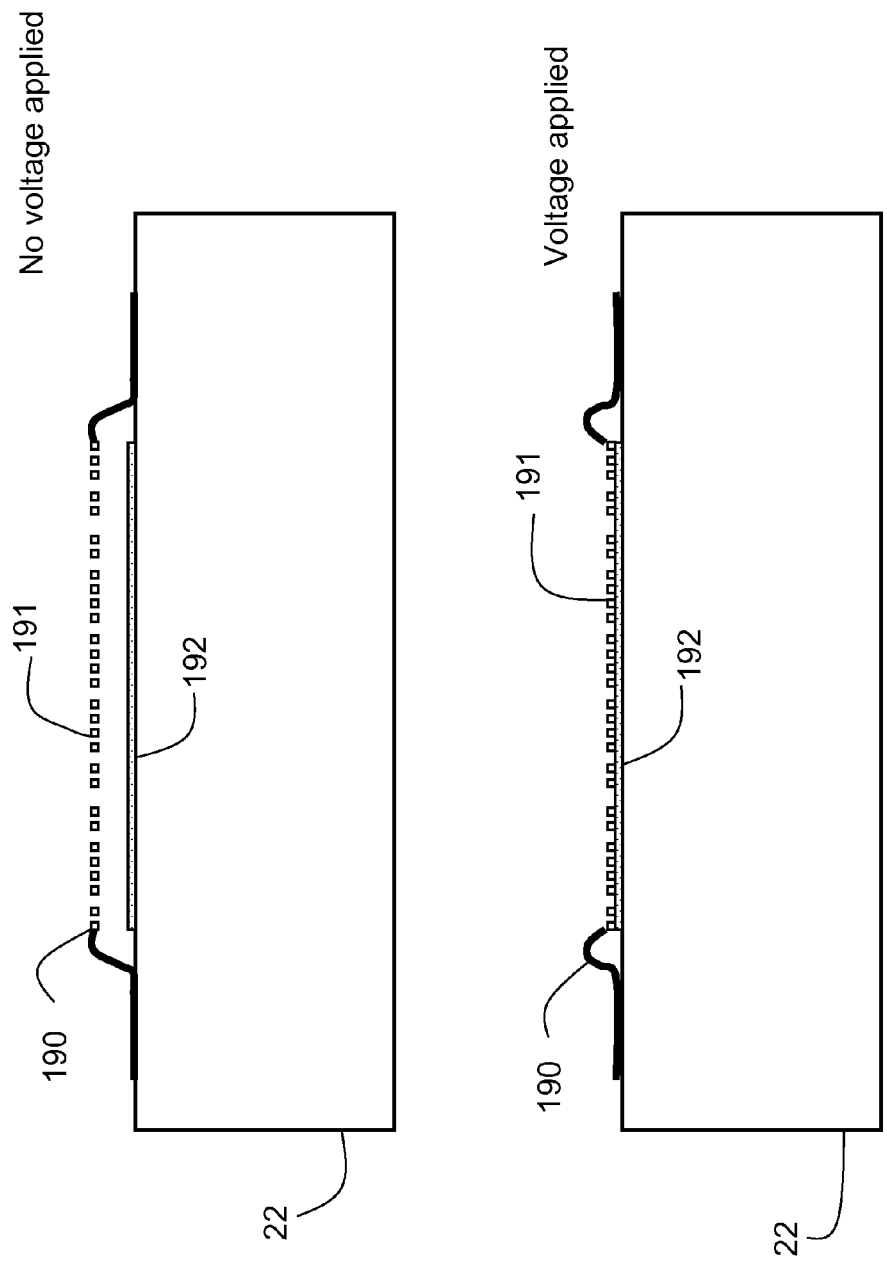
FIG. 27 depicts the diagramic view of a MEMS based optical switch.

Yet another alternative micro-actuator mechanism is MEMS (micro-electromechanical system) based electrostatic actuation. A micro-electrostatic switch is composed of two conducting membranes. One is a transparent conducting thin film electrode 192 deposited on the front side of the column fiber 22; the other consists of a metallic membrane 190 with a Bragg grating window 191 that is of the same size as that of the transparent electrode 192 directly underneath it, as shown in FIG. 27. When no voltage is applied between the two membranes, the suspended membrane with the Bragg grating 191 is separated from the transparent electrode 192 by an air gap that is larger than the evanescent decay length of the laser light 32 inside the column fiber 22. This is one of the bistable states of the suspended membrane 190. In this state, the laser light 32 inside the column fiber 22 is not coupled. When an voltage is applied, the membranes 190 are pulled together by electrostatic attraction and the laser light 32 is scattered by the random Bragg grating 191 on the upper membrane 190. To ensure that there is no discontinuity of the column fiber boundary condition due to the presence of the transparent electrodes 192, the gaps between transparent electrodes 192 need to be filled with non-conducting film of identical index of refraction as well as having the same width and depth. Without such index of refraction compensation, the abrupt discontinuities at the boundaries of the transparent electrodes would cause the laser light 32 to scatter.

Figure 28:
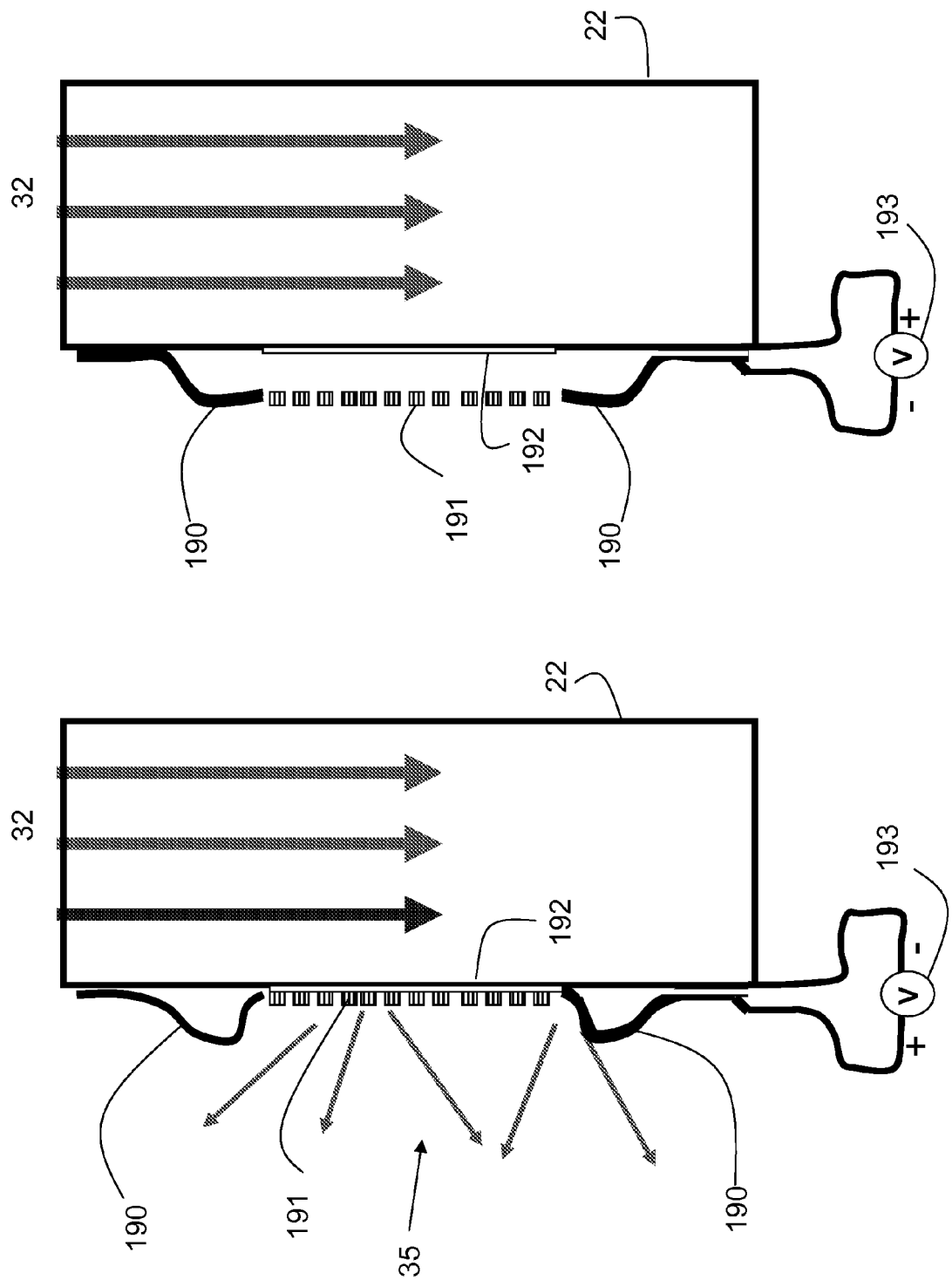
FIG. 28 shows one embodiment of optical switch active addressing using MEMS actuated Bragg grating.

FIG. 28 illustrates the MEMS actuator-based addressing. Compared to electret based actuation, to which it is the most similar, MEMS based actuation would require much higher applied voltages to exert the same force as does the electret based actuation. The big advantage of the MEMS based approach is that the MEMS approach can leverage matured semiconductor fabrication techniques without heavy retooling and minimizing the time needed to bring it to the market. The disadvantage is that MEMS technology is best suited for compact system fabrications; hence it would extrapolate poorly to large format TV displays. However, for compact displays, MEMS actuation is a viable alternative to other embodiments for pixel actuation.

Acoustic wave devices are generally described by the mode of wave propagation through or on a piezoelectric substrate. Acoustic waves are distinguished primarily by their velocities and displacement directions; many combinations are possible, depending on the material and boundary conditions. The piezoelectric material is driven by an inter-digitated transducer, or IDT. The IDT of an acoustic device provides the electric field necessary to displace the substrate and thus form an acoustic wave. The wave propagates through the substrate, where it is converted back to an electric field at the IDT on the other side. Transverse, or shear, wave have particle displacements that are normal to the direction of wave propagation and which can be polarized so that the particle displacements are either parallel to or normal to the sensing surface. Shear horizontal wave motion signifies transverse displacements polarized parallel to the sensing surface; shear vertical motion indicates transverse displacements normal to the surface. A wave propagating through he substrate is called a bulk wave. The most commonly used bulk acoustic wave devices are the thickness shear mode resonator and the shear-horizontal acoustic plate mode. If the wave propagates on the surface of the substrate, it is known as a surface wave. The most widely used surface wave devices are surface acoustic wave devices.

Surface acoustic wave, or SAW, has been widely used as Bandpass filters operating at GHz-range in mobile telecommunication systems and others requiring high-performance filter solutions as well as sensors for automotive and medical applications. Surface acoustic wave, as the name implies, is an acoustic wave traveling primarily along the interface between two media of differing acoustic speed. It is propagating on the plane of the interface, and its amplitude decays exponentially away from the interface. SAW can also propagate in layered media. In surface acoustic wave, the wave energy is confined to within one wavelength from the surface of the transducer. SAW has a longitudinal and a vertical shear component that can couple with a medium in contact with the device surface. Such coupling strongly affects the amplitude, velocity, and attenuation characteristics of the wave. Typically a SAW device uses a piezoelectric material to generate the acoustic wave. The piezoelectric material is driven by an IDT, which comprises two sets of interweaving inter-digitated electrodes 200, or electrodes with digit-like extensions. When two RF signals which are 90° out-of-phase are applied to these two electrodes, a surface acoustic wave is excited provided that the Interdigital spacing and the applied frequency match the characteristics of the surface acoustic wave. The speed of propagation of the surface acoustic wave depends on the elasticity and the mass densities of both media. Typical SAW speed is around 2000 m/s, making SAW among the slowest to propagate in solids. The wave amplitudes are up to around 0.1 micron, which makes it possible to use surface acoustic wave to modulate the column fiber.

Another type of acoustic waves is the bulk acoustic wave. Bulk acoustic waves come in several distinct modes. The best known bulk acoustic mode is the thickness shear mode, used in a quartz crystal microbalance. The acoustic wave can be excited by applying a RF voltage across the thickness of a thin substrate. The excited wave is in the form of an electromechanical standing wave across the thickness. The standing wave can exist only when the standing wave resonance condition is satisfied, therefore these devices that use thickness shear mode are also called resonators. High frequency thickness shear mode resonators can be formed using piezoelectric films and bulk silicon micromachining techniques. Another type of bulk acoustic mode is the shear horizontal mode. The devices that use such mode typically employ thin piezoelectric substrates, or plates, functioning as acoustic waveguides that confine the energy between the upper and lower surfaces of the plates. As a result, both the upper and lower surface of a plate undergoes displacement. Both bulk acoustic modes are distinguished by the relative absence of a surface-normal component of wave displacement. This would allow the piezoelectric substrate to come into contact with another surface without substantial compressional loading.

Both the surface acoustic wave and bulk acoustic wave can be employed to modulate the laser light output from a column fiber. The maximum displacement of around 0.1 micron is sufficient to allow the piezoelectric substrate to move in and out of the evanescent wave region of the guided laser light along the column fiber. Since the column fiber is relatively inelastic and there are great difficulties in positioning the piezoelectric substrate just outside of the evanescent region of the fiber consistently, a transparent thin film low modulus of elasticity substrate should be inserted between the piezoelectric thin film layer and the column fiber to act as a compliant spacer. Materials such as transparent elastomers have modulus of elasticity that is one to two orders of magnitude lower than that of a typical piezoelectric material can be deformed easily by the piezoelectric material when the latter is actuated. In fact, some of the elastomers can be compressed to less than half of its own thickness without much resistance. The introduction of a highly compliant substrate and therefore having a much lower sound speed, in direct contact with the piezoelectric SAW layer will cause the surface acoustic wave to propagate as a bulk wave in the compliant substrate. By making the compliant substrate thinner than a wavelength of the sound wave in the substrate, and close to the quarter wavelength of the sound wave in the complaint medium, the surface acoustic wave still retains roughly the same physical characteristics including the propagation characteristic. The insertion of an optically dense substance in place of an air gap inevitably changes the optical property of the evanescent field which has to be taken into account in order for this scheme to work properly. To preserve the evanescent field, the index of refraction of the compliant medium must be substantially lower than that of the column fiber. A fluorocarbon based elastomer can have optical refraction index as low as 1.40, and a heavy flint glass with 71% lead has an index of refraction as high as 1.805. With such a combination, the evanescent decay length is roughly 1.6 micron, which is still within reach of the surface wave displacement.

The compliant transparent elastomer ideally should have a thickness that is many times the decay length of the evanescent wave field to ensure that the laser light can not tunnel out.

Figure 29:
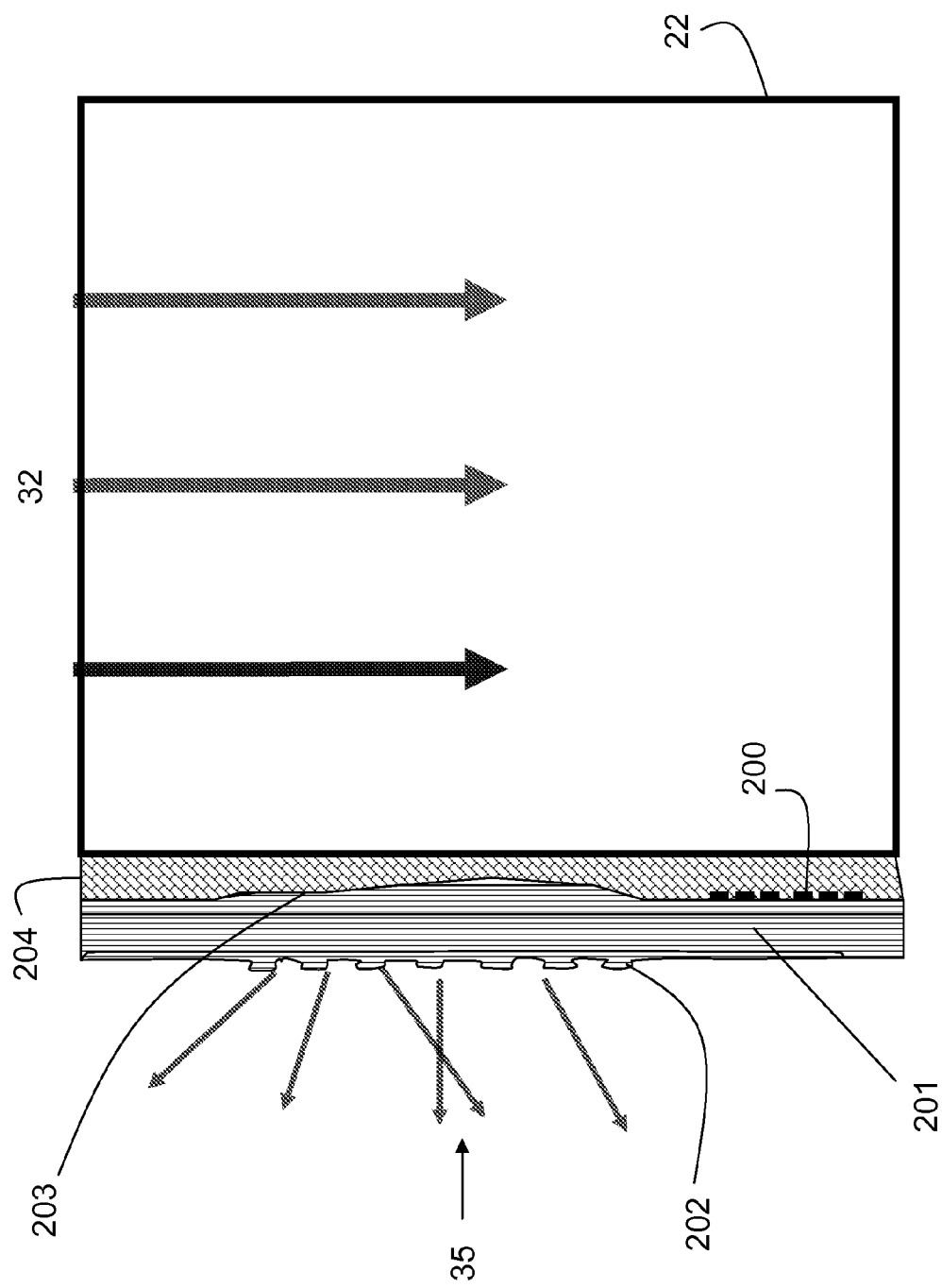
FIG. 29 shows one embodiment of surface acoustic wave based addressing with random diffusive grating.

FIG. 29 illustrates such an arrangement. Pixels are addressed row by row by sending a pulse or a wave train 203 of surface acoustic wave in the direction of increasing or decreasing row numbers. The arrival of the surface acoustic wave pulse 203 at a row location displaces the boundary between the piezoelectric material 201 and the compliant elastomer 204 inward, compressing the elastomer 204. The compression increases the optical density of the elastomer 204 which increases the optical index of refraction of the latter. The inward movement of the elastomer-piezoelectric substrate boundary, as well as the increase in the index of refraction also narrows the evanescent gap to allow the laser light to tunnel through.

Since the surface acoustic wave travels at a speed which is much higher than what is required for row scanning, a strobe technique is used which sends the SAW pulses at a high repetition rate and modulate the laser diodes at a strobe frequency which is marginally greater than the pulse frequency of the surface acoustic wave. For example, if the display screen is 50 inches in height, then the linear row scanning speed is 50 in times 60 Hz=76.2 m/s. This is roughly 20 times slower than the propagation speed of the surface acoustic wave. This can be compensated by sending the surface acoustic wave pulse at a repetition rate of 1200 Hz and set the strobe frequency of the laser diodes exactly 60 Hz faster at 1260 Hz to give the apparent scanning frequency of 60 Hz. To avoid smearing of the pixels, the duty cycle of the laser diodes has to be 1/20, or 5%. The low duty cycle is not a problem for laser diodes which have very high peak light output; hence the averaged light output won't suffer from the low duty cycle. If higher light output is desired, it can be accomplished simply by increasing the frame rate to 1200 Hz for a maximum duty cycle of 100% by repeating a frame 20 times with the aid of a frame grabber which stores an entire frame. Other duty cycles are possible either by adjusting the duty cycle within one pixel period, or by skipping rows during a frame sweep with the aid of a scan converter working in concert with a frame grabber.

Another issue with the SAW addressing scheme is the attenuation and pulse distortion of the surface acoustic wave pulse as it travels. The piezoelectric medium typically has a high Q to permit the SAW pulse to travel relatively unattenuated within a modest distance. However, the compliant elastomer layer to which the surface acoustic wave is coupled is significantly more lossy, which necessitates the use of SAW repeaters at specific intervals to amplify/regenerate the SAW pulse before any significant attenuation occurs.

Figure 30:
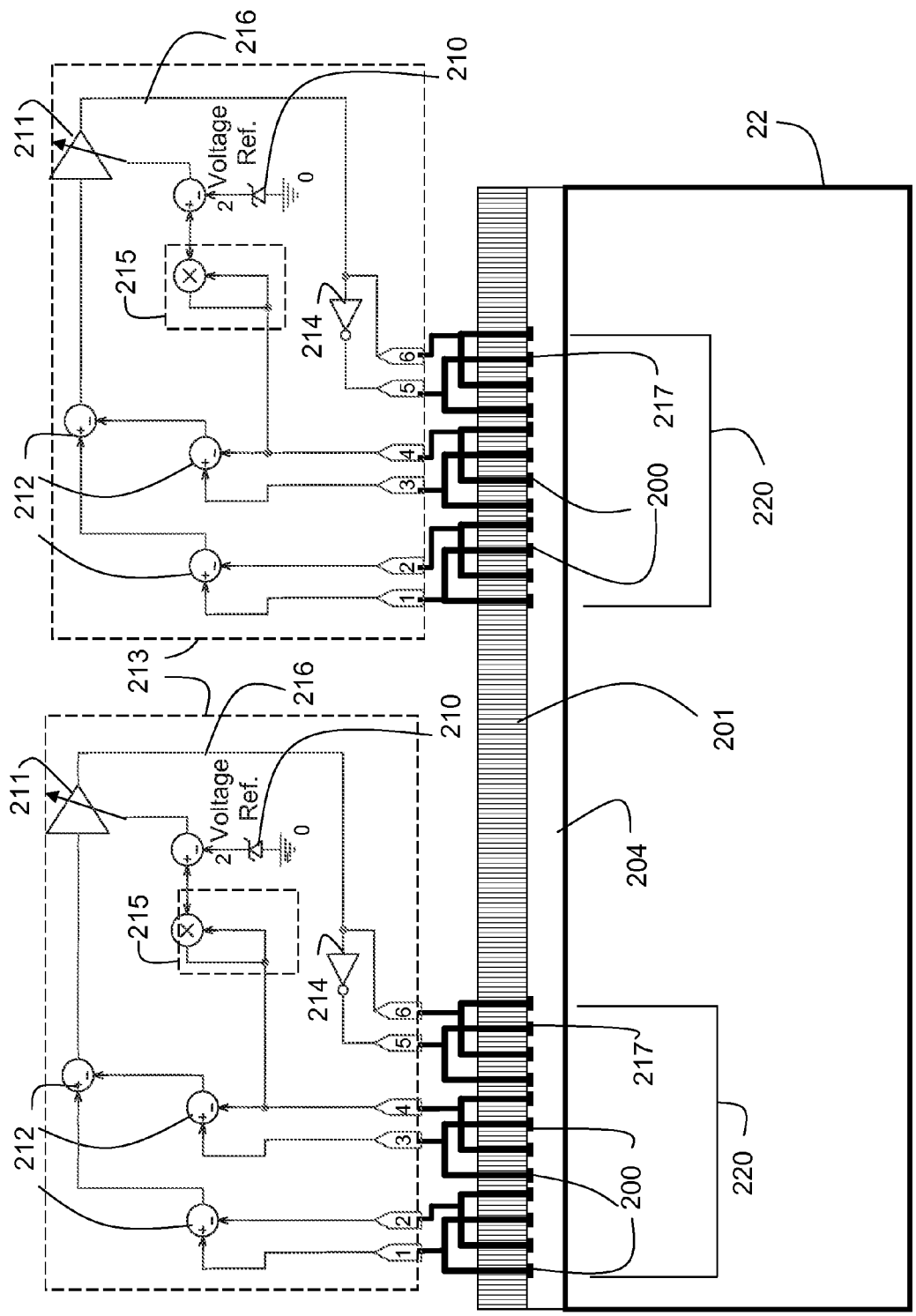
FIG. 30 is a schematic exemplar embodiment of the SAW repeater.

FIG. 30 is a schematic exemplar embodiment of the SAW repeater 213. Inter-digitated electrodes 200 are used to drive the piezoelectric thin film 201 at periodic distances. The distance between any two inter-digitated clusters 220 should be small enough to ensure little attenuation of the surface acoustic wave amplitude between the two. The inter-digitated electrodes 200 also serve as voltage sensors since as SAW propagates within the piezoelectric medium 201; it compresses and expands, causing the piezoelectric medium 201 to generate a voltage in response to such mechanical stress. Within an inter-digitated cluster 220, two sets of inter-digitated electrodes 200 sense the voltage difference between two closely spaced locations. The voltage difference is fed to a gain controlled signal amplifier 211 through a set of unity gain differential amplifiers 212. A fixed gain pre-amplifier 214 can also be introduced to improve the signal-to-noise ratio. The amplification gain of the gain controlled amplifier 211 is determined by the amplitude square (or the power) of the surface acoustic wave at that location. The amplified differential signal 216 is then used to drive, or actuate, the piezoelectric substrate 201 at a small distance downstream from where the SAW pulse amplitude is sensed. The actuation of the SAW medium is in-phase with the freely propagating SAW pulse for best efficiency. The actuation should be just sufficient to replenish the energy lost due to propagation attenuation. The actuation is through another set of inter-digitated electrodes 217 which preferentially actuates SAW signal within a narrow range of wavelength through the use of an inverter 214. Such wavelength selective amplification and actuation facilitates signal amplification. When the power as measured by the power meter 215 is smaller than a threshold value provided by the voltage reference 210, the gain of the amplifier 211 is greater than one, causing the surface wave to be amplified. Once the power of the surface acoustic wave exceeds the threshold value, the amplification gain becomes less than unity. This ensures that the SAW pulse is maintained at a constant peak value. To further guarantee that small random noises do not get amplified, another lower threshold reference can be introduced to reduce the small amplitude gain to less than unity. The lower threshold reference voltage is chosen such that it is at least one standard deviation higher than the RMS (root mean square) noise level, but not much higher. This will suppress noise while the desired SAW pulses will be amplified to their proper heights.

Figure 31:
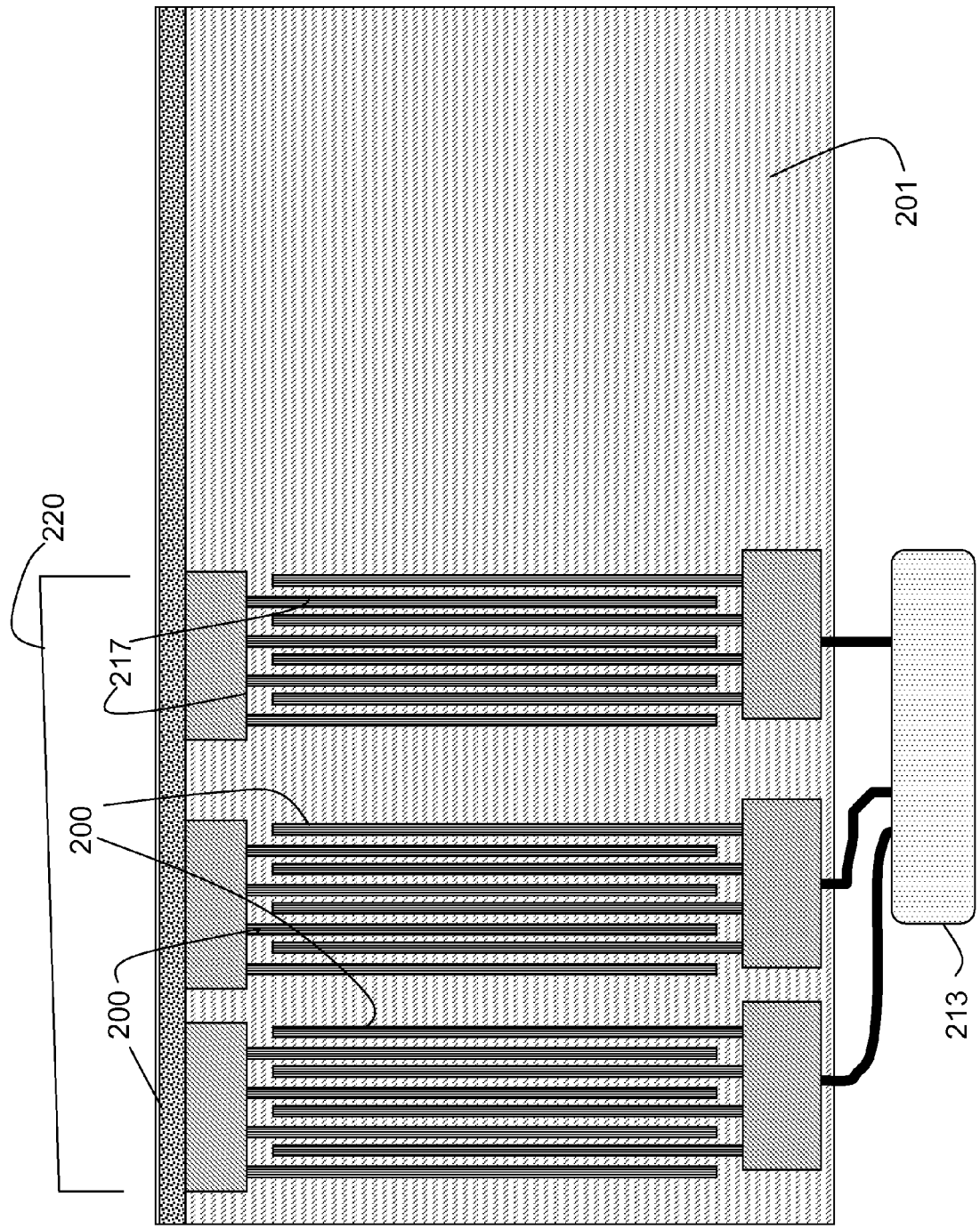
FIG. 31 is a view of the inter-digitated electrode cluster as depicted in FIG. 30.

FIG. 31 is an view of the inter-digitated electrode cluster 220 with two sensing inter-digitated electrodes 200 forming a differential pair and an actuating inter-digitated electrode 217. The spacing between two adjacent fingers of opposing inter-digitated electrodes 200, 217 is equal to the wavelength of the surface acoustic wave.

The use of inter-digitated electrodes 217 for actuation has one disadvantage, namely, it tends to stimulate SAW signals going both ways. This is because inter-digitated electrodes 217 only have two phases which are 180° apart. Thus it is impossible to distinguish a forward going SAW pulse and a backward going one. The generation of backward going SAW pulses can be suppressed by the selective nature of the sensing and amplification stages. If the amplitude of the backward SAW pulse is smaller than the lower amplification threshold, it would also be attenuated by the amplifier. One approach, however, is to employ a 3-phase inter-digitated drive technique to actuate only forward propagating SAW pulse. Such a technique is a subset of the phased antenna approach widely used in telecommunications. In this case, the 3-phase antenna array 230 has a very large front-to-back antenna gain ratio (the ratio between forward propagation and backward propagation), hence the stimulation of backward SAW pulse is almost negligible. The actual front-to-back ratio is limited by phase noise and mechanical tolerance of the inter-digitated electrodes. An exemplar embodiment of the 3-phase actuator 241 is shown in FIG. 31. Adjacent fingers 232, 233 are spaced one-third wavelength apart. Each of the three inter-digitated electrodes 230 is connected to one of the three phases supplied by a 3-phase RF generator 231. The 3-phased inter-digitated actuator 241 provides a constructive interference to the forward propagating surface acoustic wave and a destructive interference to the backward propagating surface wave.

SAW based addressing scheme requires a piezoelectric substrate which is thicker than an acoustic wavelength. Since the wavelength of an ultrasound wave is of the order of 100-200 microns (for a 10 MHz wave), the needed thickness of the piezoelectric substrate is of the order of a fraction of a millimeter to about a millimeter. For a large display screen, the material costs as well as the manufacturing cost become a factor. An alternative embodiment is to employ bulk acoustic wave instead of SAW as the optical switch. A bulk acoustic wave is essentially an obliquely propagating sonic wave which bounces back and forth between the upper and lower surfaces of the piezoelectric substrate. For bulk acoustic wave, the substrate thickness is typically considerably less than a wavelength. Because of the oblique propagation characteristic of the bulk wave, the propagation speed along the surface of the substrate is less than that of the sound wave in an infinite medium. The addition of a compliant elastic layer also modifies the speed of bulk wave propagation, with the result of slowing down the bulk wave even more. Theoretically the bulk wave can have arbitrarily small propagation speed, but in practice when the speed of propagation becomes too small, it becomes strongly sensitive to even a slight variation of the thickness of the substrate. A slower propagation speed allows slower drive electronics to be used, which reduces manufacturing cost.

Figure 32:
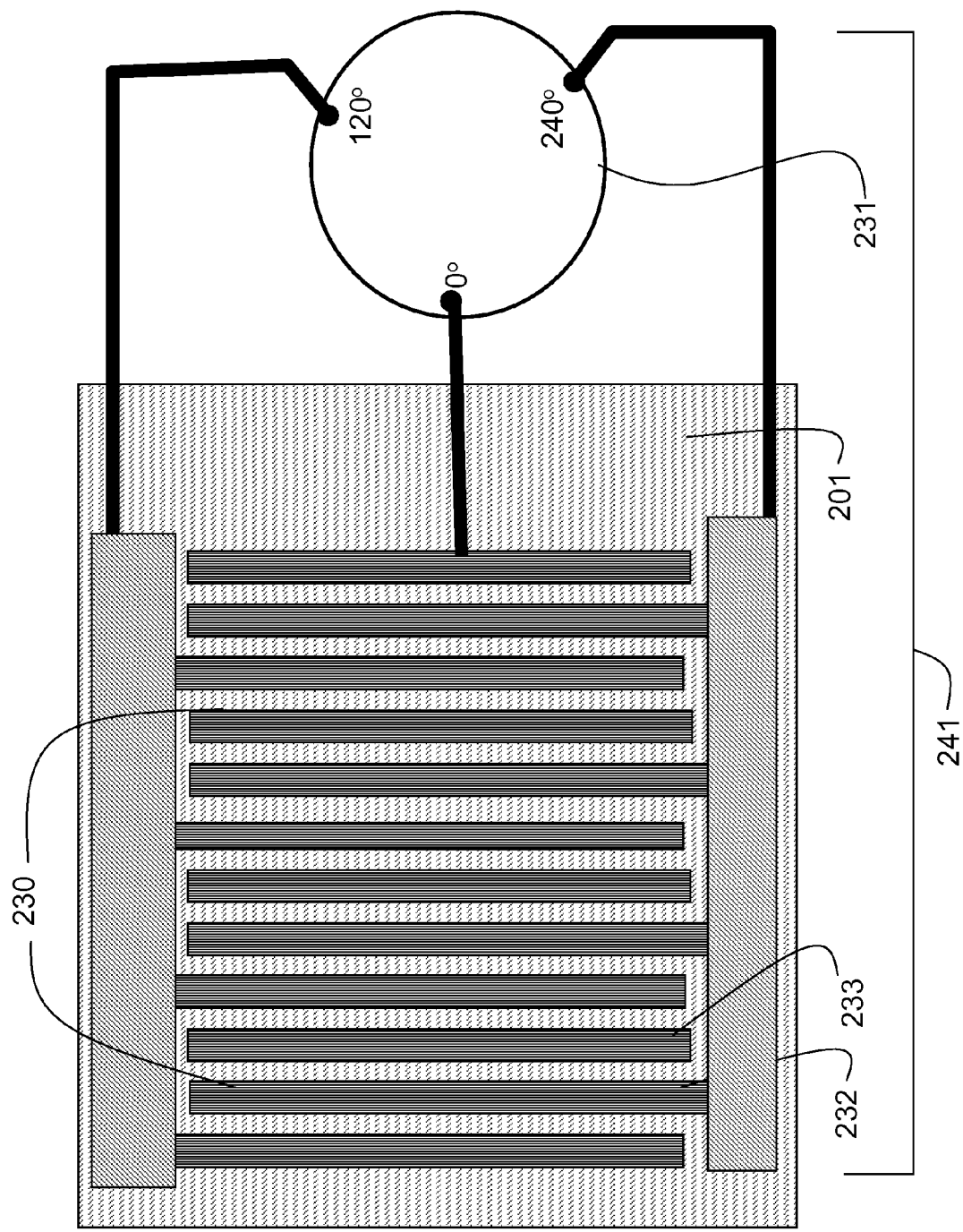
FIG. 32 is a view of an alternative embodiment using a 3-phase inter-digitated actuator.

Bulk acoustic wave pulse can be generated and amplified by the same circuit that is depicted in FIG. 30. Here again, one form of actuation is to employ a 3-phased inter-digitated electrode drive 231 as shown in FIG. 32.

Figure 33:
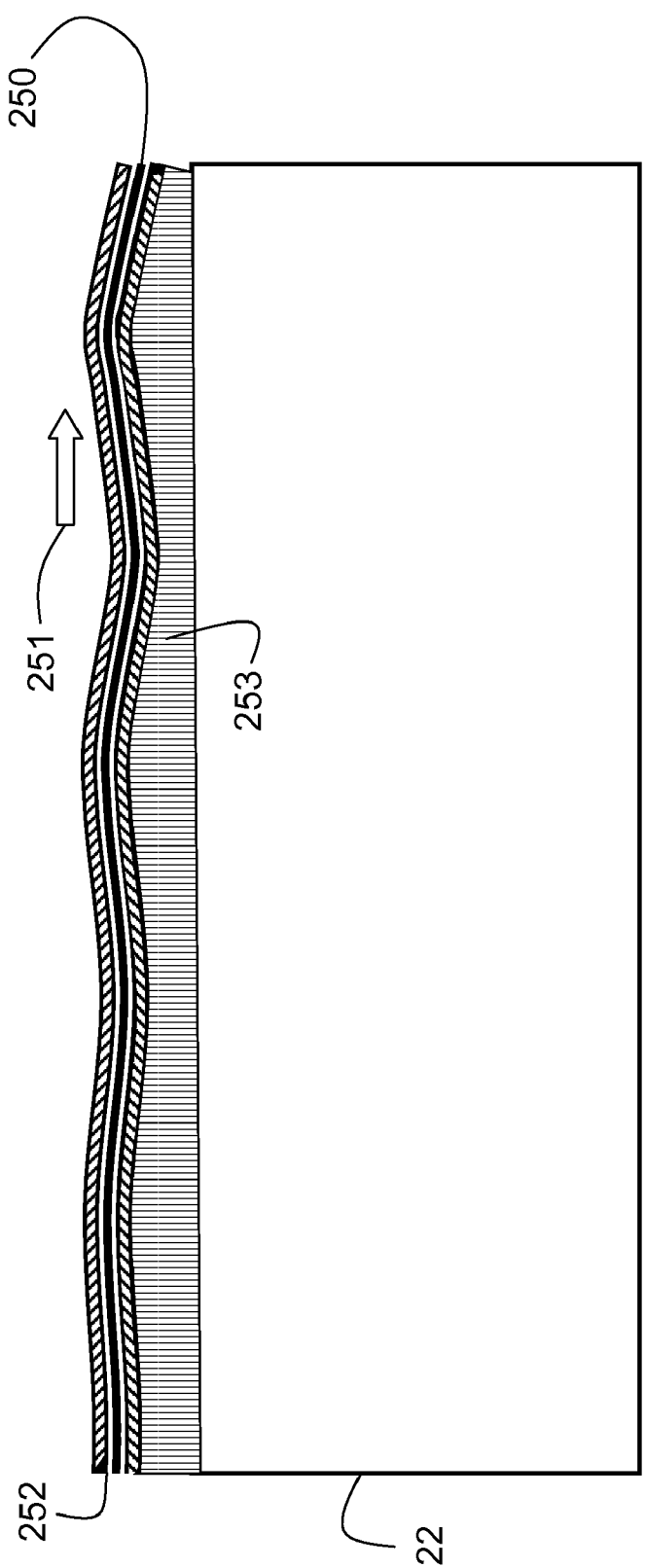
FIG. 33 shows the construction of a bimorph multi-layer for the actuation of a flexural wave.

Yet another alternative embodiment of the aforementioned acoustic actuation methods is to employ a bimorph bi-layer or multi-layer configuration for the piezoelectric thick film. FIG. 33 shows the construction of a bimorph multi-layer for the actuation of a flexural wave. As shown, a metal layer 250 is sandwiched between two piezo layers 252 of opposite polarity. The metal layer 250 provides both the bending stiffness and the electrical connectivity to the piezo layers 252. The elasticity and easy compressibility of the elastomer layer 253 also contributes to the overall stiffness. The direction of propagation is indicated by 251. Although a flexural wave is just an antisymmetric version of the bulk acoustic wave, it behaves rather differently, with propagation speed which is below that of the bulk wave. The chief advantage of the flexural wave is its larger maximum displacement than that of the bulk wave; hence the coupling to the column fiber is stronger, making it a more effective optical switcher. The flexural wave actuator is driven and amplified again by inter-digitated electrodes shown in FIG. 30, with the exception that the Interdigital fingers extend to both piezoelectric layers in the bimorph fashion. To reduce back propagation, 3-phased inter-digitated electrode depicted in FIG. 32 should preferentially be used.

Both the bulk acoustic wave and the flexural wave are more dispersive than SAW. This can be dealt by adjusting the repeater output to have a frequency dependent phase shift to provide dispersion compensation in addition to amplification.

Figure 34:
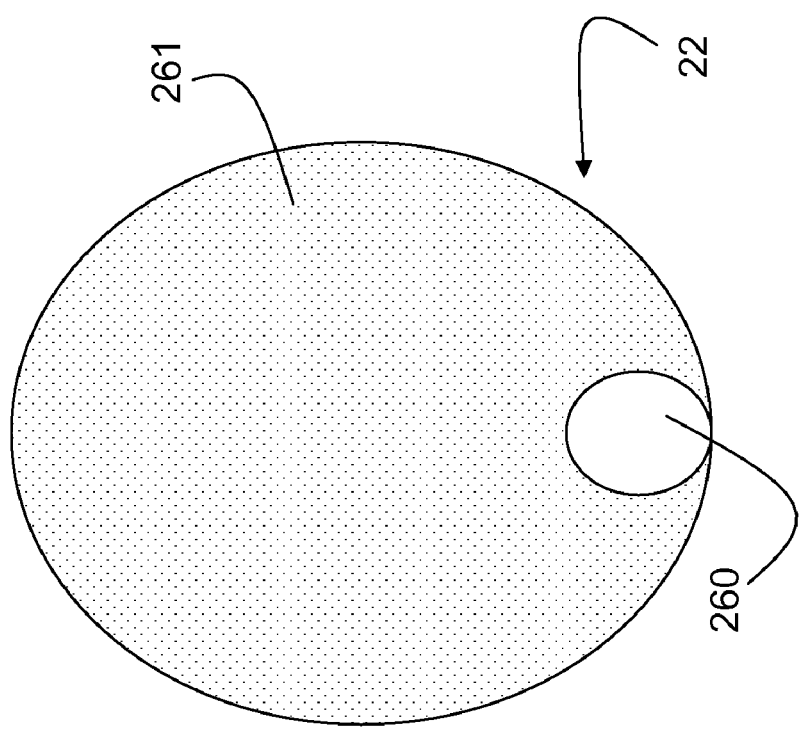
FIG. 34 is a cross sectional view of one embodiment of the column fiber with sheath.

The construction of the column fiber 22 must necessarily be different from that of the conventional fiber employed in fiber optics network. To facilitate optical switching, the core 260 of the column fiber 22 must be bare in the front in order to allow row fibers 31 to intercept its evanescent wave field of the laser light 32 traveling in the column fiber 22. The optical switch that provides the switchable optical coupling between the column fibre 22 and the row fibre 31 is labeled in the figure as 262. However, the sheath 261 is still needed elsewhere where optical coupling to external components is highly undesirable since it could cause the laser light to leak out before it can reach the row fiber 31 that it is supposed to be coupled to. The sheath 261 provides the needed optical isolation because of its lower optical index of refraction which causes the laser light to become evanescent within the sheath region and decays rapidly spatially. With a sufficiently large sheath diameter, the laser light can't reach the boundary of the sheath 261 without becoming exponentially small. In this way the sheath 261 can be attached or secured to other structural members of the display device without any concern about any laser leakage. FIG. 34 is a cross sectional view of one embodiment of the column fiber 22 with sheath 261.

Figure 35:
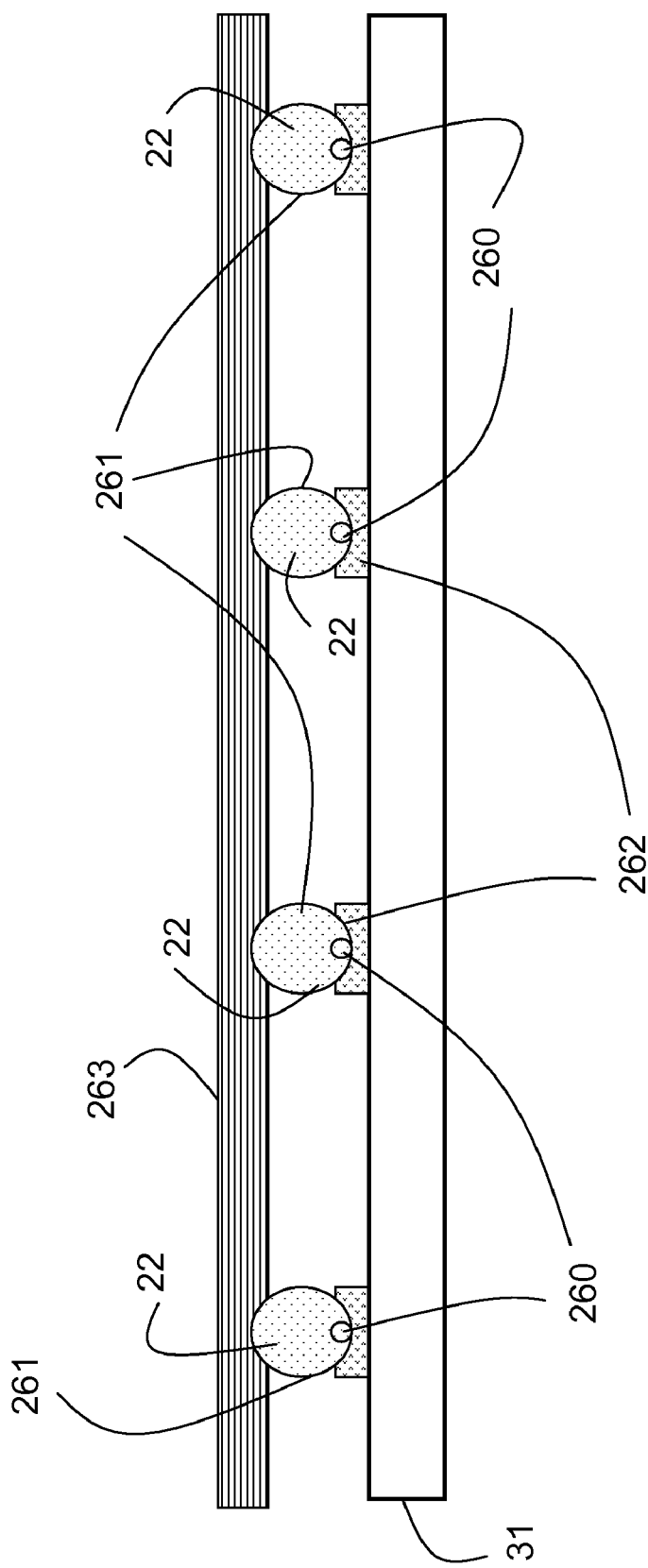
FIG. 35 is a cross sectional view illustrating the addition of a black light absorbing backing material to the fiber optics display device.

FIG. 35 is a cross sectional view illustrating the addition of a black light absorbing backing material 263 to the fiber optics display device. The back absorbing material 263 absorbs ambient stray light to prevent it from reflecting back. Reflected ambient light reduces the maximum contrast ratio, thereby degrading the image quality of the display. The back absorber can also be used as a structural element to allow the column fibers 22 to be affixed, or glued, to it.

Figure 36:
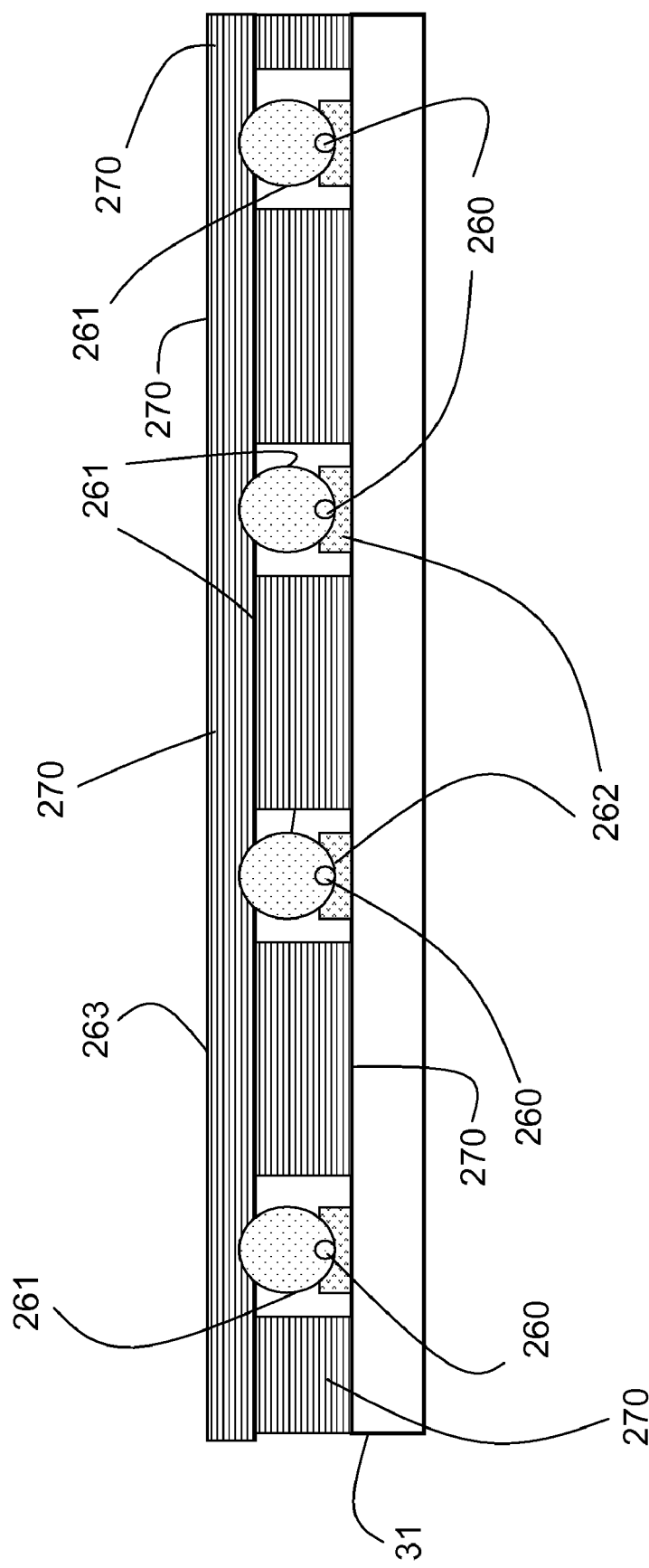
FIG. 36 is a cross sectional view depicting a further addition of a black matrix of light absorbing material to the fiber optics display device.

FIG. 36 is a cross sectional view depicting a further addition of a black matrix 270 of light absorbing material to the fiber optics display device. The black matrix elements 270 act as light barriers, preventing light emanating from one pixel to reach an adjacent pixel via row fibers 31 or other means. Light traveling along the row fiber 31 is random in nature and consequently is absorbed easily by the black matrix absorbing element 270. This reduces adjacent pixel crosstalk which improves dynamic contrast ratio.

Figure 37:
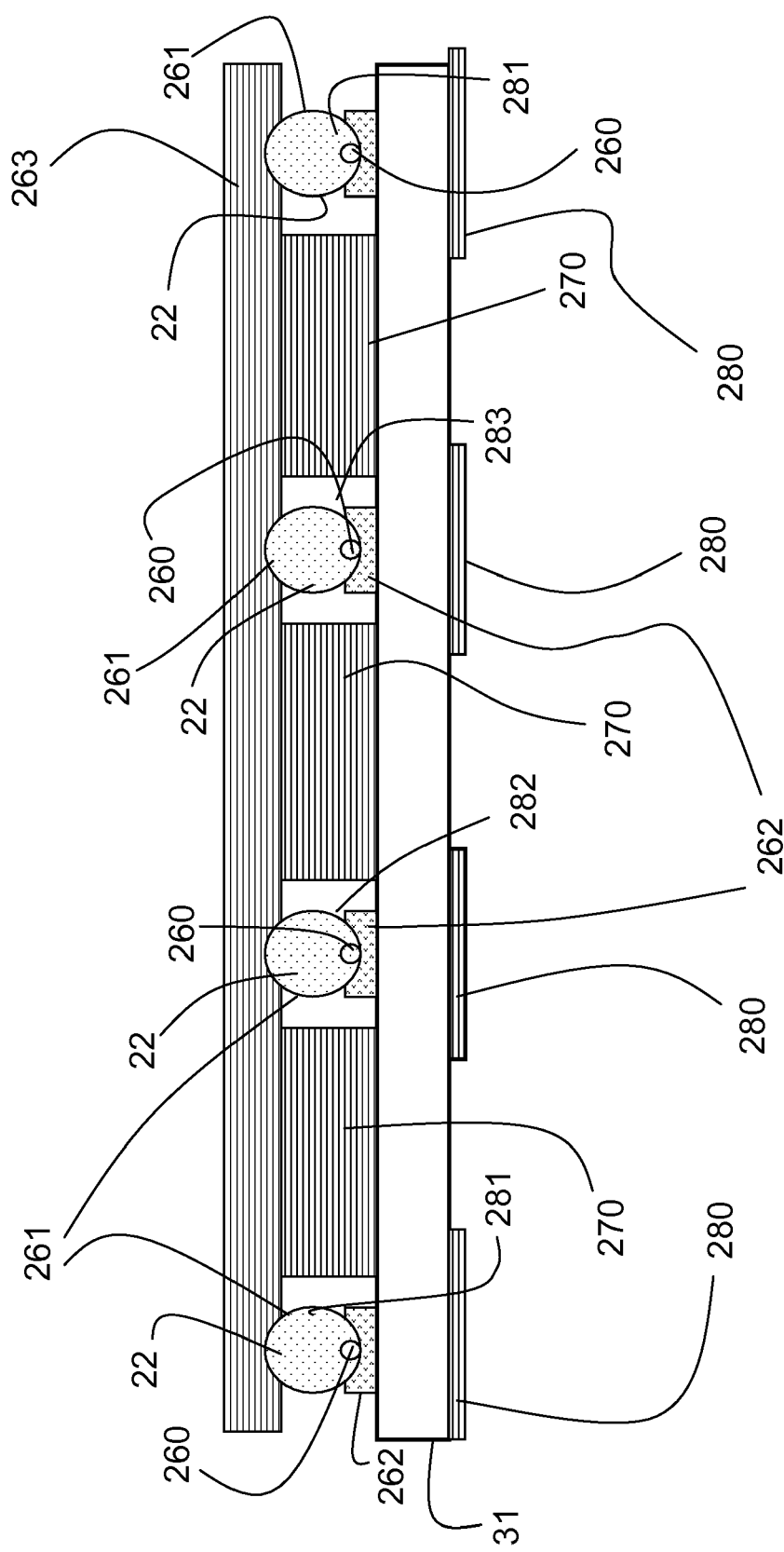
FIG. 37 depicts in cross sectional view, the addition of separate multilayer dielectric optical filters for each color pixel in a black matrix display device.

For a large screen display device, the smallest of the optical fiber diameter implies an extremely small fill factor. This makes the black matrix method hugely effective. The only way the ambient light can affect the contrast ratio of the display is to be back reflected from the front face of the row fiber, whereby the effect of the ambient light is multiplied by the small fill factor as well as by the reflection coefficient of the front faces of row fibers. A further reduction of the ambient light reflection can be accomplished by a dielectric multiplayer optical filter on the front faces of the row fibers to take advantage of the fact that the laser lights emitted by laser diodes are essentially single wavelength waves. A dielectric multilayer filter comprises more than 2 layers of thin films with stepped refractive indices designed to perform wavelength filtering. FIG. 37 depicts in cross sectional view, the addition of separate multilayer dielectric optical filters 280 for each color pixel (red: 281, green: 282, blue: 283) in a black matrix display device. Since typical ambient light has a broad spectrum of wavelengths, the wavelength selective multilayer optical filters can be designed as a narrow-band pass filter as well as a omni-directional absorber in order to absorb all but a narrow band of spectrum, allowing only the selected laser light to pass through. Such measure would reduce the reflected ambient light to almost zero. By contrast, most traditional emissive or non-emissive display technologies emit lights of broad wavelength spectrum, rendering narrowband optical filtering ineffective in improving contrast ratio of the displays in ambient light environments.

By affixing column fibers and black matrix blocks directly to the black backing material, and the row fibers and optical switching elements to the column fibers/black matrix, a very thin display can be constructed. If the backing material is in the form of a thin glass fiber, Kevlar, or carbon fiber reinforced film of sufficient strength, then a flexible, light weight display device can be made.

Laser diodes have very high light emission efficiencies. Both Red and Green laser diodes have illumination efficiencies in the 50% range, and the best blue laser diodes also have better than 30% efficiency. These efficiency figures are much higher than that of fluorescent lights and incandescent lights and orders of magnitude higher than those of CRT, OLED, LED, etc. The overall optical efficiency of the proposed laser display device is primarily determined by the laser diode efficiency, the optical coupling efficiency of the optical switches, losses in column fibers and row fibers, absorption of stray laser lights by black matrix and the back layer, the transmission coefficient of the multilayer dielectric optical filters with respect to the selected laser wavelength, etc. The optical transmission losses in column and row fibers can be minimized by using low loss fibers as well as by proper design to ensure optical leakage to keep to a minimum. Laser diode efficiency also includes optical coupling efficiency from laser diodes to column fibers, which can be improved by using high numerical aperture optics. The optical coupling efficiency between column and row fibers during addressing is a function of the coupling length as well as how deep the coupler can intercept the evanescent field of the laser wave of the column fiber. Overall optical transmission efficiency of the proposed system should be lower than that of the OLED display as the latter has more direct transmission architecture. However, this is more than compensated for by the orders of magnitude higher light generation efficiency of the laser diodes. Compared to LCD displays, which use light robbing polarizers and color filters to generate color images, both the light generation and light transmission efficiency is much higher. The use of polarizers remove more than half of the light energy, and each color filter remove roughly ⅔ or more of the light spectrum, which reduces the overall optical transmission efficiency of a LCD display to well under 16%.

It is to be appreciated that although the present invention addresses the techniques as applied to large display devices, the techniques in accordance with the present invention equally can be utilized for the construction of small size display devices in most cases with minor modifications. It is also appreciated that although the present invention does not explicitly address display devices using light sources other than laser diodes, the teachings of the present invention can readily be applied for the construction of such devices, albeit with lower efficiencies. It is equally to be appreciated that the inventive optical switching techniques disclosed above can be applied to time division multiplexing of multi-node high-speed optical fiber networks.

The foregoing detailed description of method and apparatus of the present invention have been made with reference to specific exemplary embodiments thereof. It will be self-evident that various alterations and extensions may be made thereto without departing from the broader spirit and scope of the present invention. The present specification and figures are accordingly to be regard as illuminating the principles rather than restrictive in nature. It is, furthermore, not intended that the scope of the invention in any way be limited by the above description, but instead should be determined in its entirety by reference to the following claims.

What is claimed is:

1. An apparatus comprising:
   a first layer having a distal end comprising column fibers of non-touching optical fibers arranged in a column, each respective optical fiber to be illuminated at one end by at least one laser diode, and
   a second layer substantially parallel to said first layer comprising row fibers optical fibers arranged in rows; and
   a third layer between the first and second layer, the third layer comprising optical switching elements,
   wherein each fiber of said fiber layer comprises an optical fiber sheath and a non-concentric optical fiber core.

2. The apparatus of claim 1 wherein each said switching element can be optically coupled to optical fibers in said first layer and optical fibers in said second layer simultaneously.

3. The apparatus of claim 1 wherein each said laser diode is able to emit at least one of narrowband light wave of substantially one wavelength, and two or more single wavelength colors.

4. The apparatus of claim 3 wherein a proximal face of each said fiber of the second layer is coupled to a multitude of wavelength specific narrow pass band optical filters.

5. The apparatus of claim 4 wherein each said narrow pass band optical filter is at least one of to pass transmission of laser light, absorptive relative to wavelength not within the pass band of said optical filter, and a multilayer dielectric optical filter.

6. The apparatus of claim 1 wherein each said optical fiber core has a portion of a core boundary substantially uncovered by said optical fiber sheath on a proximal side.

7. The apparatus of claim 2 wherein said optical switching element is capable of intercepting a laser wave field of the column fiber of the first layer when said switching element is actuated.

8. The apparatus of claim 1, further comprising an ambient light absorbing fourth layer.

9. The apparatus of claim 1, wherein said apparatus is to provide a display.

10. The apparatus of claim 1, further comprising an ambient light absorbing matrix of light absorbing material to block inter-pixel crosstalk.

11. The apparatus of claim 1 wherein each proximal face of said fiber of the second layer includes a diffuser to scatter laser light out of the row fiber.

12. The apparatus of claim 11, wherein the diffusers each comprise at least one of a random, two dimensional Bragg grating carved into the proximal face of said row fiber and a random, two dimensional undulations etched into a proximal face of each fiber of said row fiber.

13. The apparatus of claim 1 wherein said third layer is coupled optically and mechanically to said second layer.

14. The apparatus of claim 2 wherein said optical switching element comprises a refraction index matched transparent fluid.

15. The apparatus of claim 14 wherein said index matched transparent fluid is to be actuated by at least one of electrostatic force, an air compressor, and an electromechanical actuator, a piezoelectric bulk acoustic wave actuator.

16. The apparatus of claim 15 wherein said electromechanical actuator is one of a piezoelectric bimorph actuator, an electret actuator, a MEMS actuator, a shape memory alloy actuator, a thermal mechanical actuator, a piezoelectric SAW actuator, a piezoelectric bulk acoustic wave actuator, a piezoelectric bimorph flexural acoustic wave actuator.

17. The apparatus of claim 16 wherein said piezoelectric SAW actuator comprises one of an inter-digitated drive, a SAW repeater, a plurality of inter-digitated transducers.

18. The apparatus of claim 16 wherein said piezoelectric bulk acoustic wave actuator comprises one of an inter-digitated drive, a bulk acoustic wave repeater, a plurality of inter-digitated transducers.

19. The apparatus of claim 16 wherein said piezoelectric flexural acoustic wave actuator comprises one of an inter-digitated drive, a bulk acoustic wave repeater, and a plurality of inter-digitated transducers.

20. An apparatus comprising:
- a first layer having a distal end comprising column fibers of non-touching optical fibers arranged in a column, each respective optical fiber to be illuminated at one end by at least one laser diode, and
- a second layer substantially parallel to said first layer comprising row fibers optical fibers arranged in rows; and
- a third layer between the first and second layer, the third layer comprising optical switching elements, wherein each said switching element can be optically coupled to optical fibers in said first layer and optical fibers in said second layer simultaneously,
- said optical switching element comprises a refraction index matched transparent fluid, wherein said index matched transparent fluid is to be actuated by an electromechanical actuator that comprises one of a piezoelectric SAW actuator, a piezoelectric bulk acoustic wave actuator, and a piezoelectric bimorph flexural acoustic wave actuator.

* * * * *

UNITED STATES PATENT AND TRADEMARK OFFICE
CERTIFICATE OF CORRECTION

PATENT NO. : 7,233,722 B2  Page 1 of 1
APPLICATION NO. : 11/203865
DATED : June 19, 2007
INVENTOR(S) : Yee Chun Lee It is certified that error appears in the above-identified patent and that said Letters Patent is hereby corrected as shown below:

In Column 28,
Line 35, replace "includes a diffiser" with -- includes a diffuser --

In Column 28,
Line 40, replace "two dimensional undulations" with -- two dimensional undulation --

In Column 28,
Line 45, replace "a refiaction index" with -- a refraction index --

Signed and Sealed this

Eleventh Day of September, 2007

JON W. DUDAS
*Director of the United States Patent and Trademark Office*